(12) United States Patent
Xing et al.

(10) Patent No.: US 11,763,770 B2
(45) Date of Patent: Sep. 19, 2023

(54) ARRAY SUBSTRATE AND METHOD FOR DRIVING THE SAME, DISPLAY APPARATUS

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Zhenzhou Xing, Beijing (CN); Jianjun Wang, Beijing (CN); Hui Dong, Beijing (CN); Yuanyuan Liu, Beijing (CN); Junbo Xu, Beijing (CN); Xianfeng Yuan, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 118 days.

(21) Appl. No.: 17/432,888

(22) PCT Filed: Dec. 28, 2020

(86) PCT No.: PCT/CN2020/140310
§ 371 (c)(1),
(2) Date: Aug. 20, 2021

(87) PCT Pub. No.: WO2021/184892
PCT Pub. Date: Sep. 23, 2021

(65) Prior Publication Data
US 2022/0277703 A1    Sep. 1, 2022

(30) Foreign Application Priority Data

Mar. 18, 2020    (CN) .......................... 202010191857.1

(51) Int. Cl.
G09G 3/36 (2006.01)
G02F 1/1362 (2006.01)
G02F 1/1368 (2006.01)

(52) U.S. Cl.
CPC ......... G09G 3/3677 (2013.01); G02F 1/1368 (2013.01); G02F 1/136286 (2013.01); G09G 3/3688 (2013.01); G09G 2330/021 (2013.01)

(58) Field of Classification Search
CPC ............... G09G 3/3677; G09G 3/3688; G09G 2330/021; G02F 1/1368; G02F 1/136286
See application file for complete search history.

(56) References Cited

U.S. PATENT DOCUMENTS

2007/0085798 A1* 4/2007 Hashimoto .......... G09G 3/3648
345/93
2009/0002355 A1    1/2009 Iwatsu
(Continued)

FOREIGN PATENT DOCUMENTS

CN    101292277 A    10/2008
CN    102201215 A    9/2011
(Continued)

OTHER PUBLICATIONS

The First Office Action of Priority Application No. CN 202010191857.1 issued by the Chinese Patent Office dated Jan. 29, 2021.
(Continued)

Primary Examiner — Roy P Rabindranath
(74) Attorney, Agent, or Firm — IP & T GROUP LLP

(57) ABSTRACT

A method for driving an array substrate includes: charging six sub-pixels of each repeating unit controlled by two gate lines that are coupled to one first control sub-circuit in each of a plurality of charging phases included in a frame period; each charging phase including six charging sub-phases, and one sub-pixel of each repeating unit being charged in each (Continued)

charging sub-phase. In each charging sub-phase, the first control sub-circuit transmits a scanning signal from a scan signal transmission channel to one of two gate lines coupled thereto under control of a scan control signal transmitted by at least one scan control signal line; each second control sub-circuit transmits a data signal from a data signal transmission channel to one data line coupled to a repeating unit under control of a data control signal transmitted by at least one data control signal line.

19 Claims, 11 Drawing Sheets

(56) References Cited

U.S. PATENT DOCUMENTS

| | | |
|---|---|---|
| 2010/0123652 A1 | 5/2010 | Chen et al. |
| 2013/0093740 A1 | 4/2013 | Wang |
| 2013/0222216 A1 | 8/2013 | Park et al. |
| 2015/0084939 A1* | 3/2015 | Chen .................. G09G 3/3607 345/204 |
| 2017/0269416 A1 | 9/2017 | Miao et al. |
| 2018/0210303 A1 | 7/2018 | Wang |
| 2021/0356785 A1 | 11/2021 | Yuan et al. |

FOREIGN PATENT DOCUMENTS

| | | |
|---|---|---|
| CN | 202075968 U | 12/2011 |
| CN | 202084275 U | 12/2011 |
| CN | 102368133 A | 3/2012 |
| CN | 104700802 A | 6/2015 |
| CN | 105206242 A | 12/2015 |
| CN | 105527737 A | 4/2016 |
| CN | 106125427 A | 11/2016 |
| CN | 106940992 A | 7/2017 |
| CN | 108594554 A | 9/2018 |
| CN | 111240061 A | 6/2020 |

OTHER PUBLICATIONS

The Second Office Action of Priority Application No. CN 202010191857.1 issued by the Chinese Patent Office dated Mar. 24, 2021.

Notification to Grant Patent Right for Invention of Priority Application No. CN 202010191857.1 issued by the Chinese Patent Office dated Jun. 17, 2021.

* cited by examiner

ARRAY SUBSTRATE AND METHOD FOR DRIVING THE SAME, DISPLAY APPARATUS

CROSS-REFERENCE TO RELATED APPLICATIONS

This application is a national phase entry under 35 USC 371 of International Patent Application No. PCT/CN2020/140310 filed on Dec. 28, 2020, which claims priority to Chinese Patent Application No. 202010191857.1, filed on Mar. 18, 2020, which are incorporated herein by reference in their entirety.

TECHNICAL FIELD

The present disclosure relates to the field of display technologies, and in particular, to an array substrate and a method for driving the same, and a display apparatus.

BACKGROUND

At present, a polarity reversal driving manner is usually adopted to drive the liquid crystals in a liquid crystal display apparatus, so as to avoid a problem that the display effect is affected due to a voltage residue caused by the liquid crystal molecules being driven by a certain constant voltage for a long time.

SUMMARY

In an aspect, a method for driving an array substrate is provided. The array substrate includes: a plurality of sub-pixels, a plurality of gate lines, a plurality of data lines, a plurality of scan signal transmission channels, at least one scan control signal line, a plurality of data signal transmission channels, at least one data control signal line, a plurality of first control sub-circuits and a plurality of second control sub-circuits. The plurality of sub-pixels are arranged in an array, a row of sub-pixels are coupled to one gate line, and a column of sub-pixels are coupled to one data line. Each first control sub-circuit is coupled to the at least one scan control signal line, one scan signal transmission channel, and two gate lines. Each second control sub-circuit is coupled to the at least one data control signal line, one data signal transmission channel and three data lines.

Two rows of sub-pixels controlled by the two gate lines that are coupled to each first control sub-circuit are divided into a plurality of repeating units arranged in a row direction, and each repeating unit includes six sub-pixels arranged in two rows and three columns.

The method includes: charging the six sub-pixels of each repeating unit controlled by the two gate lines that are coupled to one first control sub-circuit in each of a plurality of charging phases included in a frame period, each charging phase including six charging sub-phases, and one sub-pixel of each repeating unit being charged in each charging sub-phase.

One sub-pixel of each repeating unit being charged in each charging sub-phase including: transmitting, by the first control sub-circuit, a scanning signal from the scan signal transmission channel to one of the two gate lines coupled thereto under control of a scan control signal transmitted by the at least one scan control signal line, so as to turn on a row of sub-pixels controlled by the gate line; transmitting, by the second control sub-circuit, a data signal from the data signal transmission channel to one data line coupled to the repeating unit under control of a data control signal transmitted by the at least one data control signal line, so as to charge one sub-pixel in the repeating unit. A voltage of the data signal transmitted by each data signal transmission channel switches between a positive voltage and a negative voltage, and a duration of the positive voltage and a duration of the negative voltage are each three charging sub-phases, and voltages of data signals transmitted by any two adjacent data signal transmission channels have opposite polarities in a same charging sub-phase.

In some embodiments, the six sub-pixels included in the repeating unit are a first sub-pixel, a second sub-pixel, a third sub-pixel, a fourth sub-pixel, a fifth sub-pixel, and a sixth sub-pixel. The six charging sub-phases included in the charging phases are a first charging sub-phase, a second charging sub-phase, a third charging sub-phase, a fourth charging sub-phase, a fifth charging sub-phase, and a sixth charging sub-phase.

Transmitting, by the first control sub-circuit, a scanning signal from the scan signal transmission channel to one of the two gate lines coupled thereto under control of a scan control signal transmitted by the at least one scan control signal line, so as to turn on a row of sub-pixels controlled by the gate line; and transmitting, by the second control sub-circuit, a data signal from the data signal transmission channel to one data line coupled to the repeating unit, under control of a data control signal transmitted by the at least one data control signal line, so as to charge one sub-pixel in the repeating unit, includes the following processes. In the first charging sub-phase, the first control sub-circuit transmits the scanning signal from the scan signal transmission channel to a first gate line of the two gate lines coupled thereto under the control of the scan control signal transmitted by the at least one scan control signal line, so as to turn on the row of sub-pixels controlled by the first gate line; the second control sub-circuit transmits the data signal from the data signal transmission channel to a first data line of the three data lines coupled to the repeating unit under the control of the data control signal transmitted by the at least one data control signal line, so as to charge a first sub-pixel in the repeating unit.

In the second charging sub-phase, the first control sub-circuit continuously transmits the scanning signal from the scan signal transmission channel to the first gate line of the two gate lines coupled thereto under the control of the scan control signal transmitted by the at least one scan control signal line, so as to continuously turn on the row of sub-pixels controlled by the first gate line; the second control sub-circuit transmits the data signal from the data signal transmission channel to a third data line of the three data lines coupled to the repeating unit under the control of the data control signal transmitted by the at least one data control signal line, so as to charge a third sub-pixel in the repeating unit.

In the third charging sub-phase, the first control sub-circuit transmits the scanning signal from the scan signal transmission channel to a second gate line of the two gate lines coupled thereto under the control of the scan control signal transmitted by the at least one scan control signal line, so as to turn on the row of sub-pixels controlled by the second gate line; the second control sub-circuit transmits the data signal from the data signal transmission channel to a second data line of the three data lines coupled to the repeating unit under the control of the data control signal transmitted by the at least one data control signal line, so as to charge a fifth sub-pixel in the repeating unit.

In the fourth charging sub-phase, the first control sub-circuit continuously transmits the scanning signal from the scan signal transmission channel to the second gate line of the two gate lines coupled thereto under the control of the scan control signal transmitted by the at least one scan control signal line, so as to continuously turn on the row of sub-pixels controlled by the second gate line; the second control sub-circuit transmits the data signal from the data signal transmission channel to the first data line of the three data lines coupled to the repeating unit under the control of the data control signal transmitted by the at least one data control signal line, so as to charge a fourth sub-pixel in the repeating unit.

In the fifth charging sub-phase, the first control sub-circuit continuously transmits the scanning signal from the scan signal transmission channel to the second gate line of the two gate lines coupled thereto under the control of the scan control signal transmitted by the at least one scan control signal line, so as to continuously turn on the row of sub-pixels controlled by the second gate line; the second control sub-circuit transmits the data signal from the data signal transmission channel to the third data line of the three data lines coupled to the repeating unit under the control of the data control signal transmitted by the at least one data control signal line, so as to charge a sixth sub-pixel in the repeating unit.

In the sixth charging sub-phase, the first control sub-circuit transmits the scanning signal from the scan signal transmission channel to the first gate line of the two gate lines coupled thereto under the control of the scan control signal transmitted by the at least one scan control signal line, so as to turn on the row of sub-pixels controlled by the first gate line; the second control sub-circuit transmits the data signal from the data signal transmission channel to the second data line of the three data lines coupled to the repeating unit under the control of the data control signal transmitted by the at least one data control signal line, so as to charge a second sub-pixel in the repeating unit.

In an odd-numbered repeating unit, the first sub-pixel, the third sub-pixel, and the fifth sub-pixel are charged with a first voltage, and the second sub-pixel, the fourth sub-pixel, and the sixth sub-pixel are charged with a second voltage. In an even-numbered repeating unit, the first sub-pixel, the third sub-pixel, and the fifth sub-pixel are charged with the second voltage, and the second sub-pixel, the fourth sub-pixel, and the sixth sub-pixel are charged with the first voltage. The first voltage and the second voltage have opposite polarities.

In some embodiments, the at least one scan control signal line includes a first scan control signal line and a second scan control signal line, and the first control sub-circuit includes a first transistor and a second transistor. In the first charging sub-phase, the second charging sub-phase and the sixth charging sub-phase, transmitting, by the first control sub-circuit, the scanning signal from the scan signal transmission channel to the first gate line of the two gate lines coupled thereto under the control of the scan control signal transmitted by the at least one scan control signal line, including: when the first transistor in the first control sub-circuit is turned on under control of a first scan control signal transmitted by the first scan control signal line in the first charging sub-phase, the second charging sub-phase, and the sixth charging sub-phase, transmitting, by the first transistor, the scanning signal from the scan signal transmission channel to the first gate line coupled thereto. In the third charging sub-phase, the fourth charging sub-phase and the fifth charging sub-phase, transmitting, by the first control sub-circuit, the scanning signal from the scan signal transmission channel to the second gate line of the two gate lines coupled thereto under the control of the scan control signal transmitted by the at least one scan control signal line, including: when the second transistor in the first control sub-circuit is turned on under control of a second scan control signal transmitted by the second scan control signal line in the third charging sub-phase, the fourth charging sub-phase and the fifth charging sub-phase, transmitting, by the second transistor, the scanning signal from the scan signal transmission channel to the second gate line coupled thereto.

In some embodiments, the at least one data control signal line includes a first data control signal line, a second data control signal line, and a third data control signal line, and the second control sub-circuit includes a third transistor, a fourth transistor, and a fifth transistor. In the first charging sub-phase and the fourth charging sub-phase, transmitting, by the second control sub-circuit, the data signal from the data signal transmission channel to the first data line of the three data lines coupled to the repeating unit, under the control of the data control signal transmitted by the at least one data control signal line, includes: when the third transistor in the second control sub-circuit is turned on under control of a first data control signal transmitted by the first data control signal line in the first charging sub-phase, transmitting, by the third transistor, the data signal from the data signal transmission channel to the first data line of the three data lines corresponding to the repeating unit, so as to charge the first sub-pixel in the repeating units; when the third transistor in the second control sub-circuit is turned on under the control of the first data control signal transmitted by the first data control signal line in the fourth charging sub-phase, transmitting, by the third transistor, the data signal from the data signal transmission channel to the first data line of the three data lines corresponding to the repeating unit, so as to charge the fourth sub-pixel in the repeating unit.

In the second charging sub-phase and the fifth charging sub-phase, transmitting, by the second control sub-circuit, the data signal from the data signal transmission channel to the third data line of the three data lines coupled to the repeating unit, under the control of the data control signal transmitted by the at least one data control signal line, includes: when the fifth transistor in the second control sub-circuit is turned on under control of a third data control signal transmitted by the third data control signal line in the second charging sub-phase, transmitting, by the fifth transistor, the data signal from the data signal transmission channel to the third data line of the three data lines corresponding to the repeating unit, so as to charge the third sub-pixel in the repeating unit; when the fifth transistor in the second control sub-circuit is turned on under the control of the third data control signal transmitted by the third data control signal line in the fifth charging sub-phase, transmitting, by the fifth transistor, the data signal from the data signal transmission channel to the third data line of the three data lines corresponding to the repeating unit, so as to charge the sixth sub-pixel in the repeating unit.

In the third charging sub-phase and the sixth charging sub-phase, transmitting, by the second control sub-circuit, the data signal from the data signal transmission channel to the second data line of the three data lines coupled to the repeating unit, under the control of the data control signal transmitted by the at least one data control signal line, includes: when the fourth transistor in the second control sub-circuit is turned on under control of a second data control signal transmitted by the second data control signal line in the third charging sub-phase, transmitting, by the fourth transistor, the data signal from the data signal transmission channel to the second data line of the three data lines corresponding to the repeating unit, so as to charge the fifth sub-pixel in the repeating unit; when the fourth transistor in the second control sub-circuit is turned on under the control of the second data control signal transmitted by the second data control signal line in the sixth charging sub-phase, transmitting, by the fourth transistor, the data signal from the data signal transmission channel to the second data line of the three data lines corresponding to the repeating unit, so as to charge the second sub-pixel in the repeating unit.

In some embodiments, the at least one data control signal line includes a first data control signal line and a second data control signal line, and the second control sub-circuit includes a third transistor, a fourth transistor and a switching unit. In the first charging sub-phase and the fourth charging sub-phase, transmitting, by the second control sub-circuit, the data signal from the data signal transmission channel to the first data line of the three data lines coupled to the repeating unit, under the control of the data control signal transmitted by the at least one data control signal line, includes: when the third transistor in the second control sub-circuit is turned on under control of a first data control signal transmitted by the first data control signal line in the first charging sub-phase, transmitting, by the third transistor, the data signal from the data signal transmission channel to the first data line of the three data lines corresponding to the repeating unit, so as to charge the first sub-pixel in the repeating units; when the third transistor in the second control sub-circuit is turned on under the control of the first data control signal transmitted by the first data control signal line in the fourth charging sub-phase, transmitting, by the third transistor, the data signal from the data signal transmission channel to the first data line of the three data lines corresponding to the repeating unit, so as to charge the fourth sub-pixel in the repeating unit.

In the second charging sub-phase and the fifth charging sub-phase, transmitting, by the second control sub-circuit, the data signal from the data signal transmission channel to the third data line of the three data lines coupled to the repeating unit, under the control of the data control signal transmitted by the at least one data control signal line, includes: when the switching unit in the second control sub-circuit is turned on under control of the first data control signal transmitted by the first data control signal line and a second data control signal transmitted by the second data control signal line in the second charging sub-phase, transmitting, by the switching unit, the data signal from the data signal transmission channel to the third data line of the three data lines corresponding to the repeating unit, so as to charge the third sub-pixel in the repeating unit; when the switching unit in the second control sub-circuit is turned on under the control of the first data control signal transmitted by the first data control signal line and the second data control signal transmitted by the second data control signal line in the fifth charging sub-phase, transmitting, by the switching unit, the data signal from the data signal transmission channel to the third data line of the three data lines corresponding to the repeating units, so as to charge the sixth sub-pixel in the repeating unit.

In the third charging sub-phase and the sixth charging sub-phase, transmitting, by the second control sub-circuit, the data signal from the data signal transmission channel to the second data line of the three data lines coupled to the repeating unit, under the control of the data control signal transmitted by the at least one data control signal line, includes: when the fourth transistor in the second control sub-circuit is turned on under control of the second data control signal transmitted by the second data control signal line in the third charging sub-phase, transmitting, by the fourth transistor, the data signal from the data signal transmission channel to the second data line of the three data lines corresponding to the repeating unit, so as to charge the fifth sub-pixel in the repeating unit; when the fourth transistor in the second control sub-circuit is turned on under the control of the second data control signal transmitted by the second data control signal line in the sixth sub-charging phase, transmitting, by the fourth transistor, the data signal from the data signal transmission channel to the second data line of the three data lines corresponding to the repeating unit, so as to charge the second sub-pixel in the repeating unit.

In another aspect, an array substrate is provided, including: a plurality of sub-pixels, a plurality of gate lines, a plurality of data lines, a plurality of scan signal transmission channels, at least one scan control signal line, a plurality of data signal transmission channels, at least one data control signal line, a plurality of first control sub-circuits and a plurality of second control sub-circuits. The plurality of sub-pixels are arranged in an array, a row of sub-pixels are coupled to one gate line, and a column of sub-pixels are coupled to one data line.

Each first control sub-circuit is coupled to the at least one scan control signal line, one scan signal transmission channel and two gate lines. The first control sub-circuit is configured to transmit a scanning signal transmitted by the scan signal transmission channel coupled thereto to the two gate lines coupled thereto under control of a scan control signal transmitted by the at least one scan control signal line, so as to turn on two rows of sub-pixels coupled to the two gate lines at different times. Each second control sub-circuit is coupled to the at least one data control signal line, one data signal transmission channel and three data lines. The second control sub-circuit is configured to transmit a data signal transmitted by the data signal transmission channel coupled thereto to the three data lines coupled thereto under control of a data control signal transmitted by the at least one data control signal line, so as to charge sub-pixels that are turned on by the two gate lines coupled to the first control sub-circuit in sub-pixels coupled to the three data lines at different times.

In some embodiments, the plurality of sub-pixels are arranged in 2n rows and 3m columns. The plurality of gate lines include 2n gate lines, the plurality of data lines include 3m data lines, the plurality of scan signal transmission channels include n scan signal transmission channels, the plurality of data signal transmission channels include m data signal transmission channels, the at least one scan control signal line includes two scan control signal lines, the at least one data control signal line includes at least two data control signal lines, the plurality of first control sub-circuits include n first control sub-circuits, and the plurality of second control sub-circuits include m second control sub-circuits, wherein n and m are positive integers.

An i-th first control sub-circuit is coupled to an i-th scan signal transmission channel, a $(2i-1)$-th gate line and a $2i$-th gate line, wherein i is greater than or equal to 1 and less than or equal to n ($1 \leq i \leq n$) and i is a positive integer. A j-th second control sub-circuit is coupled to a j-th data signal transmission channel, a $(3j-2)$-th data line, a $(3j-1)$-th data line, and a $3j$-th data line, wherein j is greater than or equal to 1 and less than or equal to m ($1 \leq j \leq m$), and j is a positive integer.

In some embodiments, the at least one scan control signal line includes a first scan control signal line and a second scan control signal line. The first control sub-circuit includes a first transistor and a second transistor.

A control electrode of the first transistor is coupled to the first scan control signal line, a first electrode of the first transistor is coupled to the scan signal transmission channel coupled to the first control sub-circuit, and a second electrode of the first transistor is coupled to one of the two gate lines coupled to the first control sub-circuit. A control electrode of the second transistor is coupled to the second scan control signal line, a first electrode of the second transistor is coupled to the scan signal transmission channel coupled to the first control sub-circuit, and a second electrode of the second transistor is coupled to another of the two gate lines coupled to the first control sub-circuit.

In some embodiments, the at least one data control signal line includes a first data control signal line and a second data control signal line. The second control sub-circuits includes a third transistor and a fourth transistor.

A control electrode of the third transistor is coupled to the first data control signal line, a first electrode of the third transistor is coupled to the data signal transmission channel that is coupled to the second control sub-circuit, and a second electrode of the third transistor is coupled to a first data line of the three data lines coupled to the second control sub-circuit. A control electrode of the fourth transistor is coupled to the second data control signal line, a first electrode of the fourth transistor is coupled to the data signal transmission channel that is coupled to the second control sub-circuit, and a second electrode of the fourth transistor is coupled to a second data line of the three data lines coupled to the second control sub-circuit.

In some embodiments, the at least one data control signal line further includes a third data control signal line. The second control sub-circuit further includes a fifth transistor.

A control electrode of the fifth transistor is coupled to the third data control signal line, a first electrode of the fifth transistor is coupled to the data signal transmission channel that is coupled to the second control sub-circuit, and a second electrode of the fifth transistor is coupled to a third data line of the three data lines coupled to the second control sub-circuit.

In some embodiments, the second control sub-circuit further includes a switching unit, the switching unit is coupled to the first data control signal line and the second data control signal line, and the switching unit is also coupled to the data signal transmission channel that is coupled to the second control sub-circuit and a third data line of the three data lines that are coupled to the second control sub-circuit. The switching unit is configured to transmit the data signal transmitted by the data signal transmission channel coupled thereto to the data line coupled thereto under control of a first data control signal transmitted by the first data control signal line and a second data control signal transmitted by the second data control signal line.

In some embodiments, the switching unit includes a sixth transistor and a seventh transistor. A control electrode of the sixth transistor is coupled to the first data control signal line, a first electrode of the sixth transistor is coupled to the data signal transmission channel that is coupled to the switching unit, and a second electrode of the sixth transistor is coupled to a first electrode of the seventh transistor. A control electrode of the seventh transistor is coupled to the second data control signal line, and a second electrode of the seventh transistor is coupled to the third data line coupled to the switching unit.

In some embodiments, the sixth transistor and the seventh transistor are of a same type, the third transistor and the fourth transistor are of a same type, and the type of the sixth transistor and the seventh transistor is different from the type of the third transistor and the fourth transistor.

In some embodiments, the switching unit includes an NAND circuit and an eighth transistor. The NAND circuit is coupled to the first data control signal line, the second data control signal line and a control electrode of the eighth transistor. The NAND circuit is configured to output a control signal for controlling the eighth transistor to be turned on under control of the first data control signal transmitted by the first data control signal line and the second data control signal transmitted by the second data control signal line. A first electrode of the eighth transistor is coupled to the data signal transmission channel that is coupled to the switching unit, and a second electrode of the eighth transistor is coupled to the third data line that is coupled to the switching unit.

In some embodiments, the third transistor, the fourth transistor, and the eighth transistor are of a same type.

In some embodiments, the at least one scan control signal line extends in a column direction in which the plurality of sub-pixels are arranged, and the at least one data control signal line extends in a row direction in which the plurality of sub-pixels are arranged.

In some embodiments, each sub-pixel includes a driving transistor. The at least one scan control signal line includes a first scan control signal line and a second scan control signal line, and the at least one data control signal line includes a first data control signal line and a second data control signal line. The first control sub-circuit includes a first transistor and a second transistor, and the second control sub-circuit includes a third transistor and a fourth transistor. A control electrode of the first transistor is coupled to the first scan control signal line, a first electrode of the first transistor is coupled to the scan signal transmission channel coupled to the first control sub-circuit, and a second electrode of the first transistor is coupled to one of the two gate lines coupled to the first control sub-circuit. A control electrode of the second transistor is coupled to the second scan control signal line, a first electrode of the second transistor is coupled to the scan signal transmission channel coupled to the first control sub-circuit, and a second electrode of the second transistor is coupled to another of the two gate lines coupled to the first control sub-circuit. A control electrode of the third transistor is coupled to the first data control signal line, a first electrode of the third transistor is coupled to the data signal transmission channel that is coupled to the second control sub-circuit, and a second electrode of the third transistor is coupled to a first data line of the three data lines coupled to the second control sub-circuit. A control electrode of the fourth transistor is coupled to the second data control signal line, a first electrode of the fourth transistor is coupled to the data signal transmission channel that is coupled to the second control sub-circuit, and a second electrode of the fourth transistor is coupled to a second data line of the three data lines coupled to the second control sub-circuit. Gates, active layers, and sources and drains of the first transistor, the second transistor, the third transistor, and the fourth transistor are respectively disposed in a same layer as a gate, an active layer, and a source and a drain of the driving transistor.

In yet another aspect, a display apparatus is provided, including: the array substrate as described in any one embodiment of the above aspect, a gate driving circuit and a source driving circuit. The gate driving circuit has a plurality of scan signal output channels and at least one scan control signal output channel, each scan signal output channel is coupled to one scan signal transmission channel in the array substrate, and each scan control signal output channel is coupled to one scan control signal line in the array substrate. The source driving circuit has a plurality of data signal output channels and at least one data control signal output channel, each data signal output channel is coupled to one data signal transmission channel in the array substrate, and each data control signal output channel is coupled to one data control signal line in the array substrate.

In some embodiments, the gate driving circuit has two scan control signal output channels, and the source driving circuit has two or three data control signal output channels.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

DETAILED DESCRIPTION

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, features defined by "first" and "second" may explicitly or implicitly include one or more of the features. In the description of the embodiments of the present disclosure, the term "a plurality of" or "the plurality of" means two or more unless otherwise specified.

Figure 1:
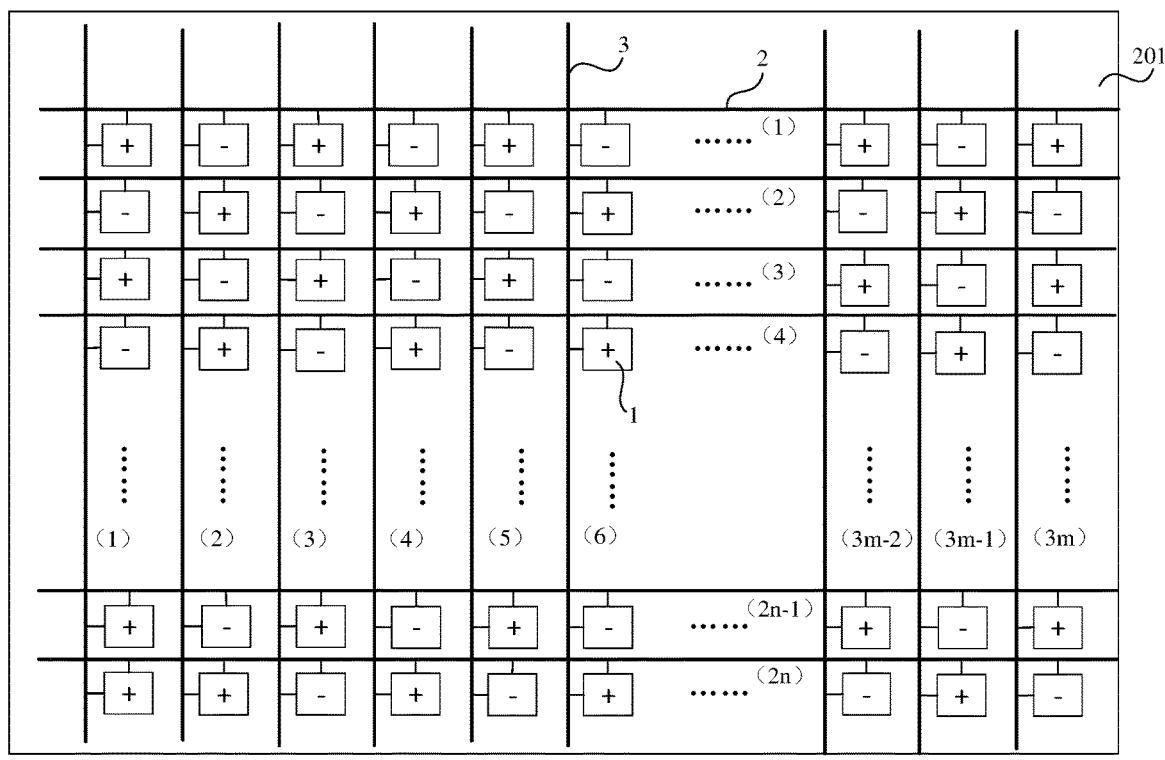
FIG. 1 is a diagram showing a structure of an array substrate, in accordance with some embodiments in the related art.
Figure 2:
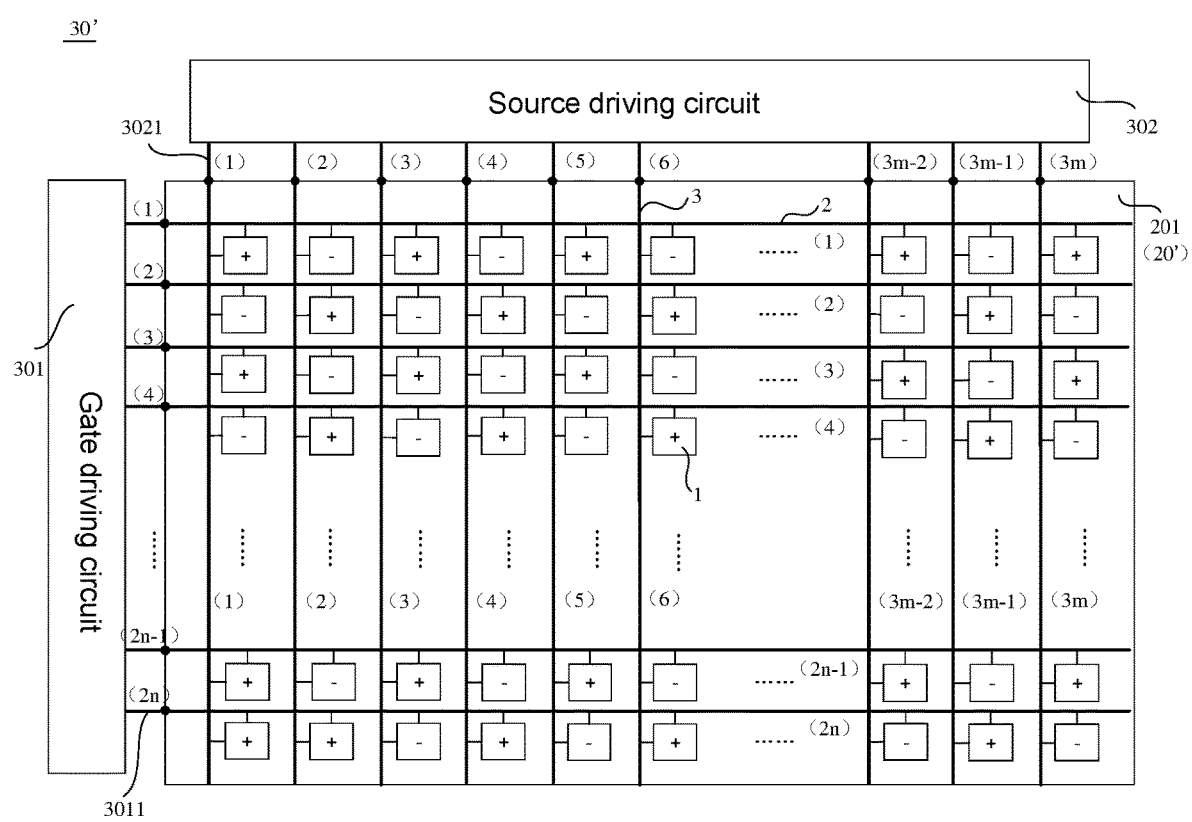
FIG. 2 is a diagram showing a structure of a display apparatus, in accordance with some embodiments in the related art.

In the related art, as shown in FIGS. 1 and 2, an array substrate 20' in a liquid crystal display apparatus includes a plurality of sub-pixels 1 arranged in an array, a plurality of gate lines 2 and a plurality of data lines 3. Each gate line 2 is coupled to a row of sub-pixels 1, and each data line 3 is coupled to a column of sub-pixels 1. The plurality of sub-pixels 1, the plurality of gate lines 2 and the plurality of data lines 3 are disposed on a base substrate 201 in the array substrate 20'.

Referring to FIG. 2, a liquid crystal display apparatus 30' further includes a source driving circuit 302 and a gate driving circuit 301. The source driving circuit 302 is connected to the array substrate 20' in a bonding manner; the gate driving circuit 301 is connected to the array substrate 20' in a bonding manner, or, the gate driving circuit 301 is integrated on the array substrate by a means of gate on array (GOA).

The gate driving circuit 301 has a plurality of scan signal output channels 3011. Each scan signal output channel 3011 is coupled to one gate line 2 for outputting a scanning signal to the gate line 2, so as to turn on a row of sub-pixels 1 controlled by the gate line 2. In a case where the gate driving circuit 301 is integrated on the array substrate by the means of GOA, the plurality of scan signal output channels 3011 of the gate driving circuit 301 refer to output terminals of the gate driving circuit 301, i.e., signal output terminals of a plurality of shift registers included in the gate driving circuit 301.

The source driving circuit 302 has a plurality of data signal output channels 3021. Each data signal output channel 3021 is coupled to one data line 3 for outputting a data signal to the data line 3, so as to charge sub-pixels 1 that are turned on in a column of sub-pixels 1 controlled by the data lines 3.

That is, the number of scan signal output channels 3011 of the gate driving circuit 301 is equal to the number of the gate lines 2 in the array substrate 20', and the number of data signal output channels 3021 of the source driving circuit 302 is equal to the number of the data lines 3 in the array substrate 20'. For example, the array substrate 20' includes 2n by 3m sub-pixels 1, 2n gate lines 2 and 3m data lines 3; correspondingly, the gate driving circuit 301 has 2n scan signal output channels 3011, and the source driving circuit 302 has 3m data signal output channels 3021.

At present, a polarity reversal driving manner commonly used in the liquid crystal display apparatus includes: a frame inversion manner, a row inversion manner, a column inversion manner, and a dot inversion manner. The dot inversion manner is that, in one frame period, voltages of data signals charged in every two adjacent sub-pixels 1 have opposite polarities. The dot inversion manner has advantages of less crosstalk and flicker, which may greatly improve the quality of images displayed by the display apparatus and thus is widely utilized.

Figure 3:
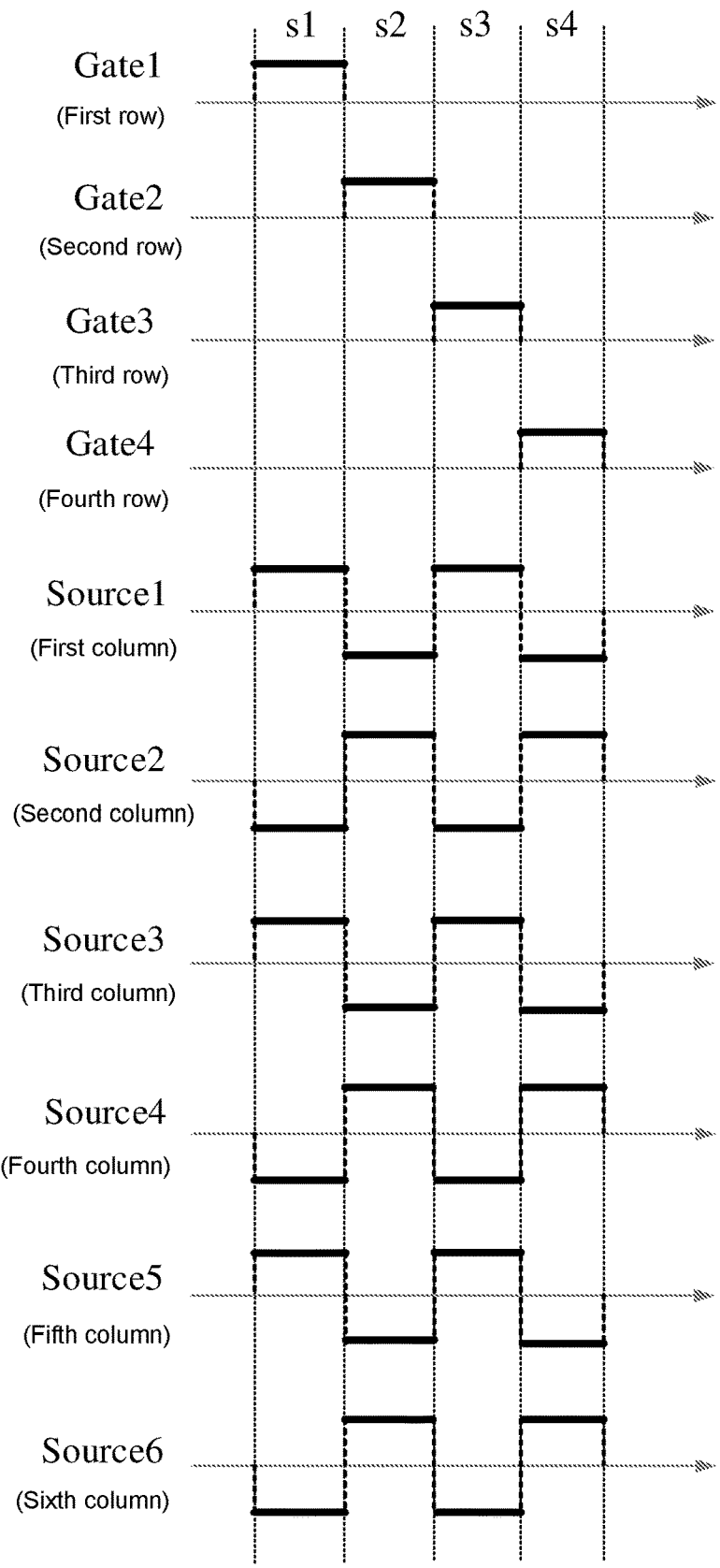
FIG. 3 is a timing diagram of a method for driving an array substrate, in accordance with some embodiments in the related art.

Referring to FIG. 3, in the related art, a driving process of the array substrate 20' shown in FIG. 1 using the dot inversion manner is that: one frame period includes 2n charging phases s, which are s1 to s2n, and a row of sub-pixels 1 are charged in each charging phase s. FIG. 3 only illustrates the first four charging phases s1 to s4, and the first row to the fourth row of sub-pixels 1 are charged respectively in the four charging phases s1 to s4.

In one frame period, the 2n scan signal output channels 3011 of the gate driving circuit 301 output scanning signals one by one, so that the 2n gate lines 2 sequentially receive the scanning signals, and sequentially turn on 2n rows of sub-pixels 1.

The 3m data signal output channels 3021 of the source driving circuit 302 continue to output data signals, and a level of the data signal continuously output by each data signal output channel 3021 switches between a positive value and a negative value. Duration of a positive voltage and duration of a negative voltage are both one charging phase s, and voltages of data signals output by any two adjacent data signal output channels 3021 have opposite polarities in a same charging phase. Duration of each level is one charging phase.

Thus, in each charging phase, a corresponding gate line 2 receives a scanning signal, and turns on a row of sub-pixels 1 corresponding thereto. The 3m data lines 3 receive data signals, and charge the data signals into the row of sub-pixels 1 that are turned on. In this way, the 2n rows of sub-pixels 1 are charged in one frame period. Moreover, according to change manners of levels of the data signals in a timing diagram shown in FIG. 3, as shown in FIG. 1, in the plurality of sub-pixels 1, voltages charged in every two adjacent sub-pixels 1 have opposite polarities, thereby achieving the dot inversion.

In the array substrate 20', the number of required scan signal output channels 3011 of the gate driving circuit 301 is equal to the number of the gate lines 2 (which are both 2n), and the number of required data signal output channels 3021 of the source driving circuit 302 is equal to the number of the data lines 3 (which are both 3m). Too many channels will increase cost of the source driving circuit 302 and the gate driving circuit 301.

Moreover, in the dot inversion driving manner corresponding to the array substrate 20', one frame period includes 2n charging phases s, and in each charging phase, a row of sub-pixels 1 are charged. In each charging phase, a positive/negative polarity of the voltage of the data signal output by each data signal output channel 3021 of the source driving circuit 302 needs to be switched once. That is, in each charging phase s, the positive/negative polarity of the voltage of the data signal output by each data signal output channel 3021 of the source driving circuit 302 will be switched after one sub-pixel 1 is charged each time, and a switching frequency is very high. Moreover, the 3m data lines 3 are in one-to-one correspondence with the 3m data signal output channels 3021. That is, after each data line 3 charges one sub-pixel 1 each time, the positive/negative polarity of the voltage on the data line 3 is switched once. In the liquid crystal display apparatus, a power consumption of a panel mainly comes from the switching of the of the voltage polarity of the data signal received by the data line 3, which greatly increases the power consumption of the liquid crystal display apparatus 30'.

Figure 4:
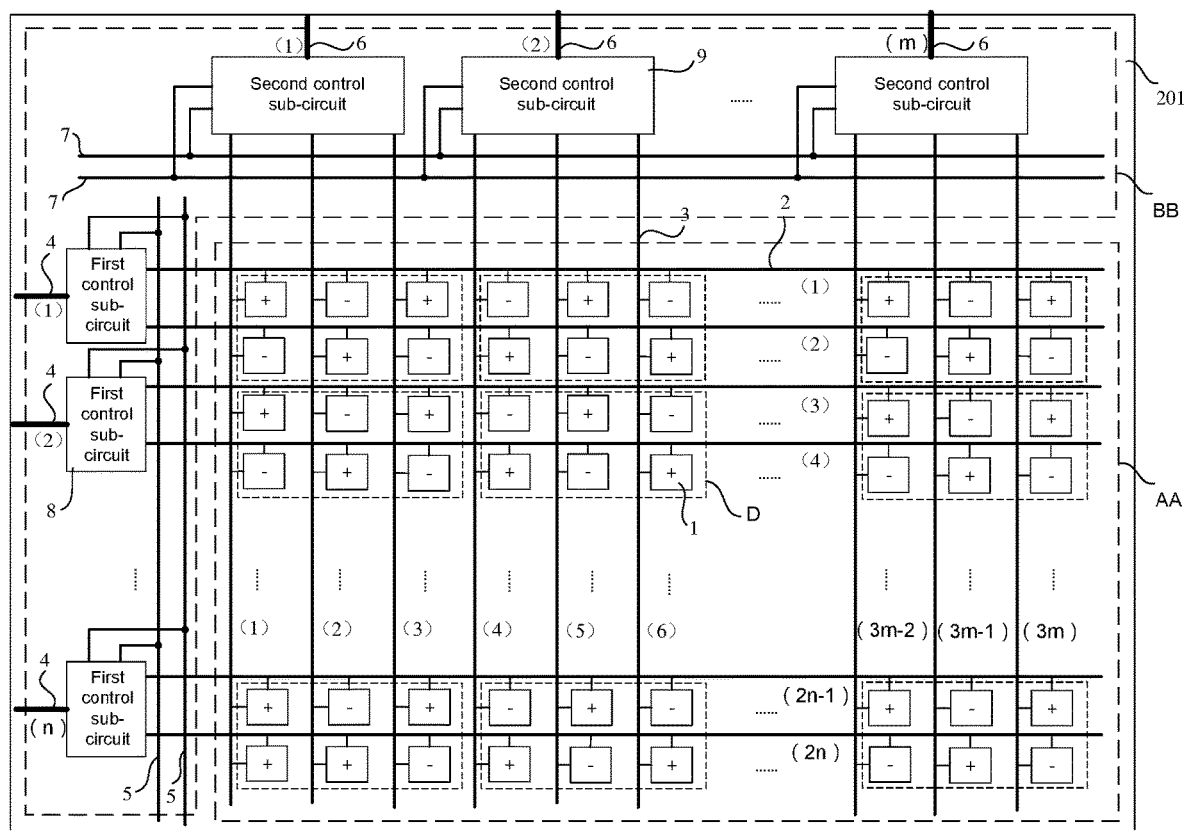
FIG. 4 is a diagram showing a structure of an array substrate, in accordance with some embodiments of the present disclosure.

On this basis, as shown in FIG. 4, in some embodiments of the present disclosure, an array substrate 20 is provided. The array substrate 20 includes: the plurality of sub-pixels 1, the plurality of gate lines 2, the plurality of data lines 3, a plurality of scan signal transmission channels 4, at least one scan control signal line 5, a plurality of data signal transmission channels 6, at least one data control signal line 7, a plurality of first control sub-circuits 8 and a plurality of second control sub-circuits 9.

The plurality of sub-pixels 1 are arranged in an array, each gate line 2 is coupled to a row of sub-pixels 1, and each data line 3 is coupled to a column of sub-pixels 1.

For example, the plurality of sub-pixels 1 are arranged in 2n rows and 3m columns, the number of the plurality of sub-pixels 1 is 2n by 3m, and the array substrate 20 includes 2n gate lines 2 and 3m data lines 3, wherein n and m are both positive integers.

Each first control sub-circuit 8 is coupled to the at least one scan control signal line 5, one scan signal transmission channel 4, and two gate lines 2. That is, one scan signal transmission channel 4 corresponds to two gate lines 2. As shown in FIG. 4, the array substrate 20 includes n scan signal transmission channels 4. The first control sub-circuit 8 is configured to transmit a scanning signal transmitted by the scan signal transmission channel 4 coupled thereto to the two gate lines 2 coupled thereto under control of a scan control signal transmitted by the at least one scan control signal line 5, so as to turn on two rows of sub-pixels 1 coupled to the two gate lines 2 at different times.

Each second control sub-circuit 9 is coupled to the at least one data control signal line 7, one data signal transmission channel 6 and three data lines 3. That is, one data signal transmission channel 6 corresponds to three data lines 3. As shown in FIG. 4, the array substrate 20 includes m data signal transmission channels 6. The second control sub-circuit 9 is configured to transmit a data signal transmitted by the data signal transmission channel 6 coupled thereto to the three data lines 3 coupled thereto under control of a data control signal transmitted by the at least one data control signal line 7, so as to charge sub-pixels 1 that are turned on by one of the two gate lines 2 in the sub-pixels 1 coupled to the three data lines 3 at different times.

For example, the array substrate 20 includes n scan signal transmission channels 4, m data signal transmission channels 6, two scan control signal lines 5, at least two data control signal lines 7, n first control sub-circuits 8 and m second control sub-circuits 9.

An i-th first control sub-circuit 8 is coupled to an i-th scan signal transmission channel 4, a (2i−1)-th gate line 2 and a 2i-th gate line 2; i is greater than or equal to 1 and less than or equal to n (1≤i≤n) and i is a positive integer. In this way, the i-th first control sub-circuit 8 is configured to transmit the scanning signal transmitted by the i-th scan signal transmission channel 4 coupled thereto to the (2i−1)-th gate line 2 and the 2i-th gate line 2 coupled thereto under control of the scan control signals transmitted by the two scan control signal lines 5, so as to turn on the (2i−1)-th row and the 2i-th row of sub-pixels 1 coupled to the two gate lines 2 at different times.

A j-th second control sub-circuit 9 is coupled to a j-th data signal transmission channel 6, a (3j−2)-th data line 3, a (3j−1)-th data line 3, and a 3j-th data line 3; j is greater than or equal to 1 and less than or equal to m (1≤j≤m), and j is a positive integer. In this way, the j-th second control sub-circuit 9 is configured to transmit the data signal transmitted by the j-th data signal transmission channel 6 coupled thereto to the (3j−2)-th data line 3, the (3j−1)-th data line 3, and the 3j-th data line 3 coupled thereto under control of the data control signals transmitted by the at least two data control signal lines 7, so as to charge sub-pixels 1, turned on by one of the two gate lines 2, in the (3j−2)-th column, the (3j−1)-th column, and the 3j-th column of sub-pixels 1 coupled to the three data lines 3 at different times.

Figure 11:
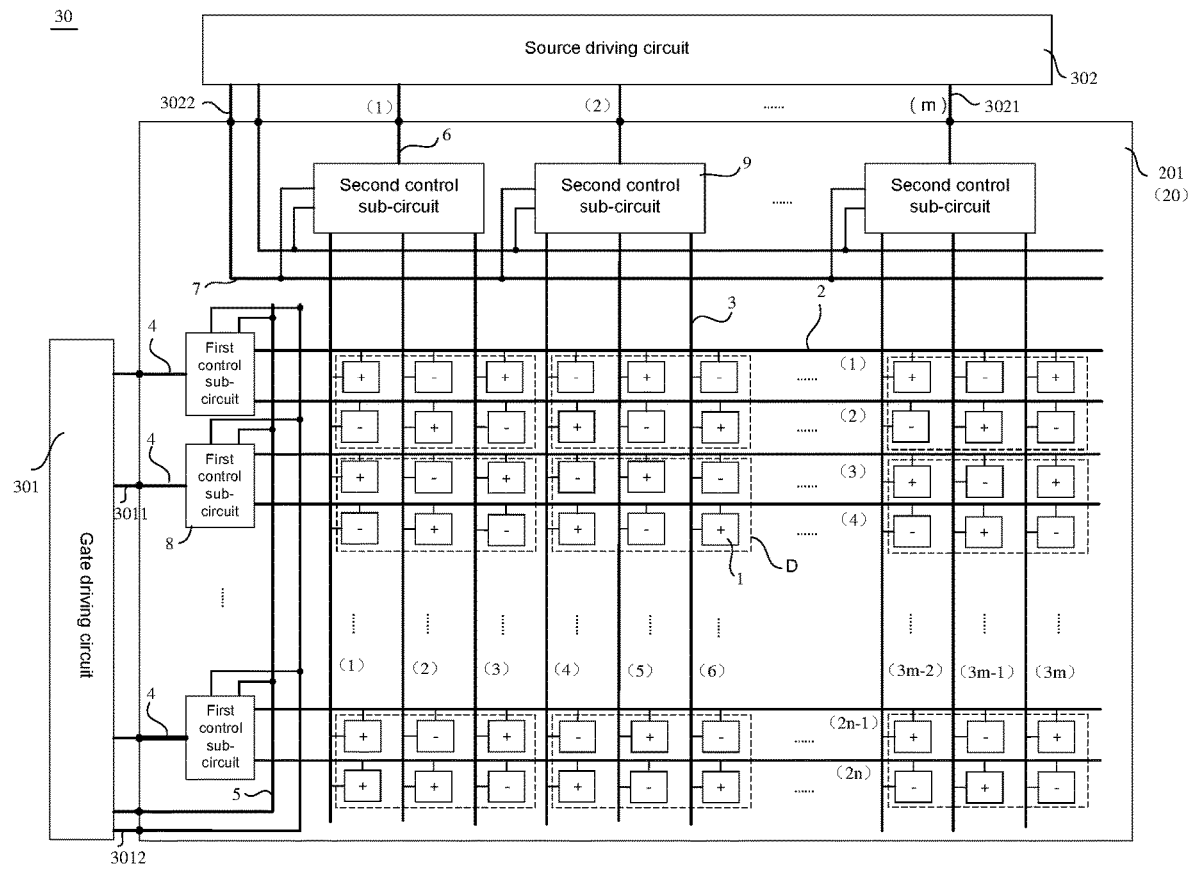
FIG. 11 is a diagram showing a structure of a display apparatus, in accordance with some embodiments of the present disclosure.

As shown in FIG. 11, in some embodiments of the present disclosure, a display apparatus 30 is also provided. The display apparatus 30 includes the array substrate 20, the gate driving circuit 301 and the source driving circuit 302. The source driving circuit 302 is connected to the array substrate 20 in a bonding manner; the gate driving circuit 301 is connected to the array substrate 20 in a bonding manner, or, the gate driving circuit 301 is integrated on the array substrate by a means of GOA.

The gate driving circuit 301 has a plurality of scan signal output channels 3011, and each scan signal output channel 3011 is coupled to one scan signal transmission channel 4 in the array substrate 20. The source driving circuit 302 has a plurality of data signal output channels 3021, and each data signal output channel 3021 is coupled to one data signal transmission channel 6 in the array substrate 20.

In addition, the gate driving circuit 301 further has at least one scan control signal output channel 3012, and each scan control signal output channel 3012 is coupled to one scan control signal line 5 in the array substrate 20. The source driving circuit 302 further has at least one data control signal output channel 3022, and each data control signal output channel 3022 is coupled to one data control signal line 7 in the array substrate 20.

In the display apparatus 30, the number of required scan signal output channels 3011 of the gate driving circuit 301 is equal to the number of the scan signal transmission channels 4 in the array substrate 20 (which are both n), and the number of required data signal output channels 3021 of the source driving circuit 302 is equal to the number of the data signal transmission channels 6 in the array substrate 20 (which are both m). In this way, compared with a situation that in the display apparatus 30' in the related art, the number of the scan signal output channels 3011 of the gate driving circuit 301 is 2n, and the number of the data signal output channels 3021 of the source driving circuit 302 is 3m, in the display apparatus 30 provided by some embodiments of the present disclosure, the number of the scan signal output channels 3011 of the gate driving circuit 301 is reduced by half, and the number of the data signal output channels 3021 of the source driving circuit 302 is reduced by two thirds, thereby reducing the cost of the source driving circuit 302 and the gate driving circuit 301, and thus reducing cost of the display apparatus.

Based on the dot inversion driving manner, a method for driving the array substrate 20 is as follows.

For convenience of description, the plurality of sub-pixels 1 are divided in the following manner. Two rows of sub-pixels 1 controlled by two gate lines 2 coupled to each first control sub-circuit 8 are divided into a plurality of repeating units D arranged in a row direction, and each repeating unit D includes six sub-pixels 1 arranged in two rows and three columns. For example, as shown in FIGS. 4 to 7, the array substrate 20 includes 2n by 3m sub-pixels 1, two rows of sub-pixels 1 controlled by two gate lines 2 coupled to each first control sub-circuit 8 are divided into m repeating units D, and all sub-pixels 1 included in the array substrate 20 are divided into m by n repeating units D.

Figure 8:
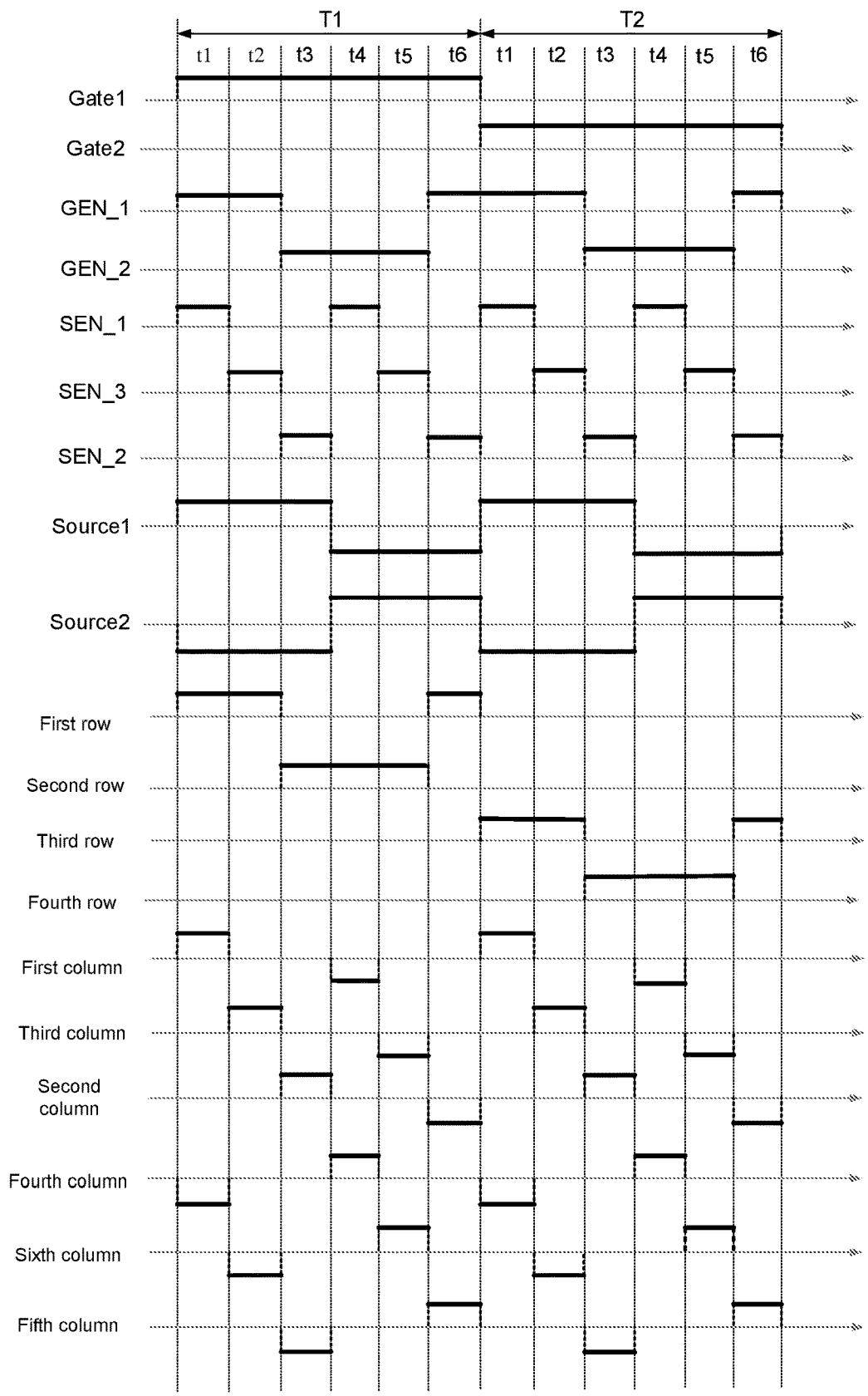
FIG. 8 is a timing diagram of a method for driving an array substrate, in accordance with some embodiments of the present disclosure.
Figure 9:
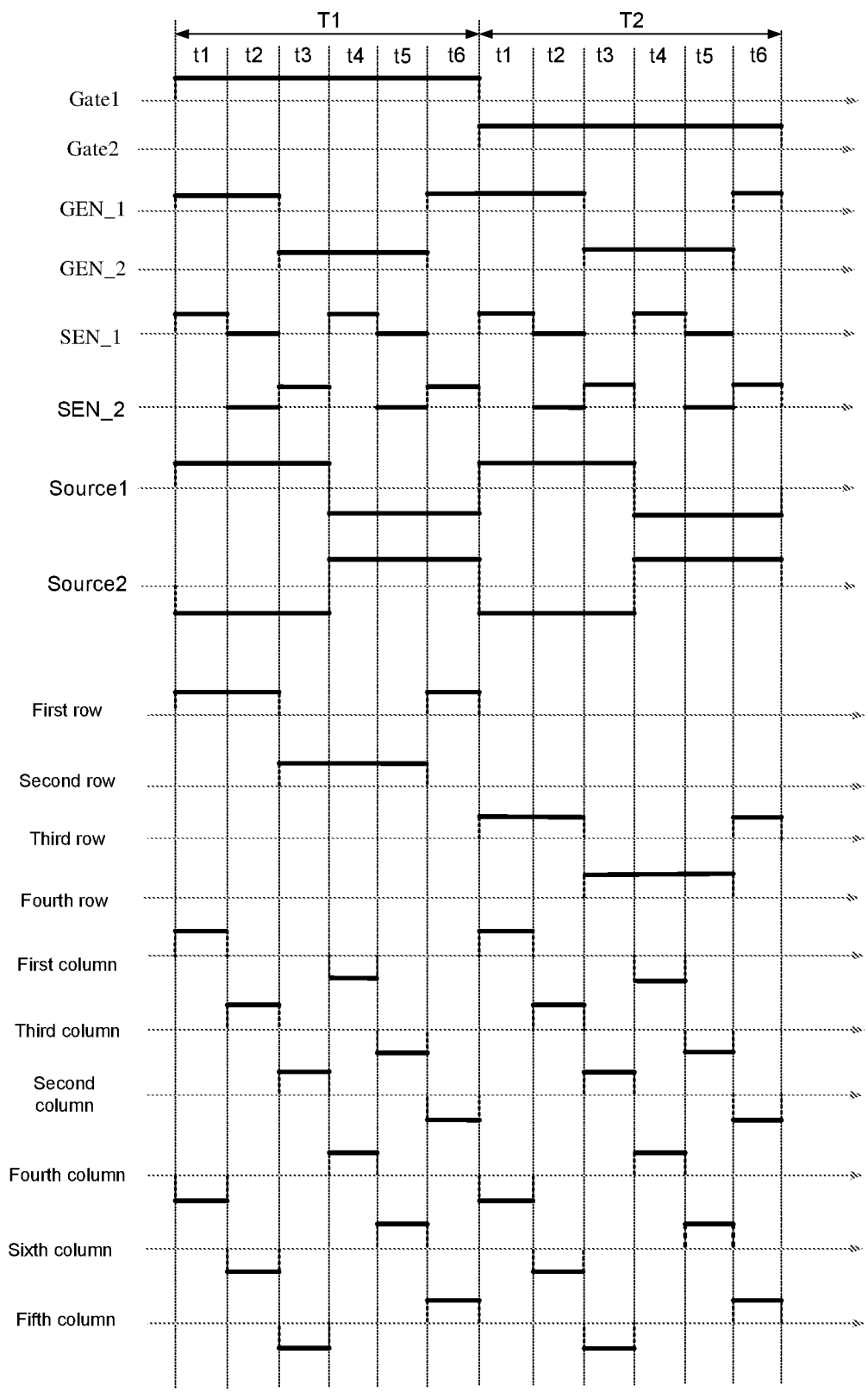
FIG. 9 is a timing diagram of another method for driving an array substrate, in accordance with some embodiments of the present disclosure.
Figure 10:
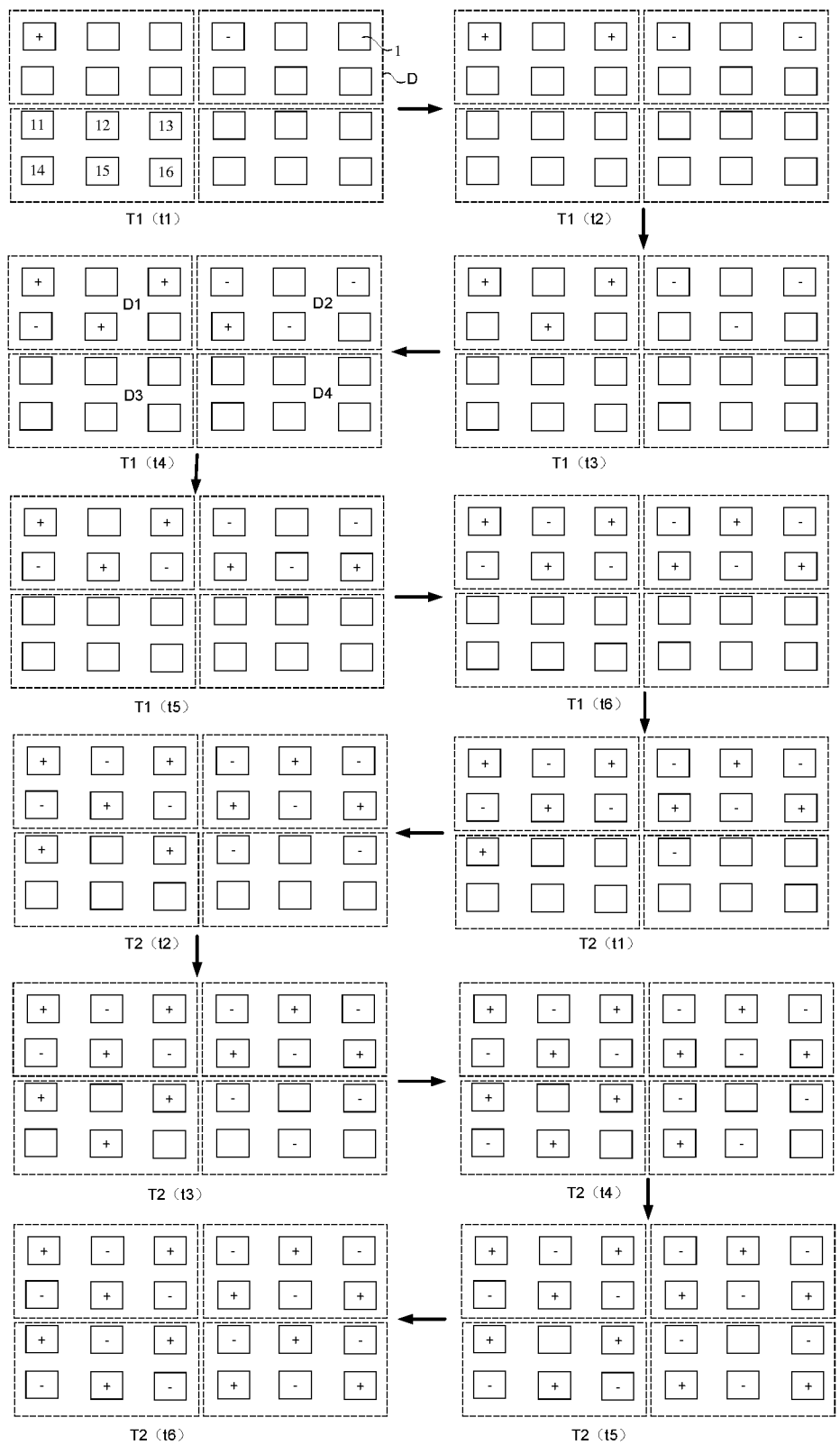
FIG. 10 is a diagram showing a charging order of some sub-pixels in an array substrate, in accordance with some embodiments of the present disclosure.

Referring to FIGS. 8 to 10, the driving method includes the following steps.

One frame period includes a plurality of charging phases T. In each charging phase T, six sub-pixels 1 of each repeating unit D controlled by two gate lines 2 that are coupled to one first control sub-circuit 8 are charged. In an i-th charging phase T, six sub-pixels 1 of each repeating unit D controlled by two gate lines 2 coupled to the i-th first control sub-circuit 8 are charged. Each charging phase T includes six charging sub-phases t, and one sub-pixel 1 of each repeating unit D is charged in each charging sub-phase t.

For example, for the array substrate 20 shown in FIGS. 4 to 7, the array substrate 20 includes 2n by 3m sub-pixels 1, 2n gate lines 2, n scan signal transmission channels 4 and n first control sub-circuits 8. That is, one frame period includes n charging phases T, and two rows of sub-pixels 1 controlled by two gate lines 2 coupled to one first control sub-circuit 8 are charged in each charging phase T, so as to charge 2n rows of sub-pixels 1 controlled by 2n gate lines 2 that are coupled to n first control sub-circuits 8 in one frame period. As a result, all sub-pixels 1 included in the array substrate 20 are charged with voltages.

In each charging sub-phase t, the first control sub-circuit 8 transmits the scanning signal from the scan signal transmission channel 4 to one of the two gate lines 2 coupled thereto under control of the scan control signal transmitted by the at least one scan control signal line 5, so as to turn on the row of sub-pixels 1 controlled by the gate line 2.

Each second control sub-circuit 9 transmits the data signal from the data signal transmission channel 6 to one data line 3 coupled to a repeating unit D under control of the data control signal transmitted by the at least one data control signal line 7, so as to charge one sub-pixel 1 in the repeating unit D.

That is, as shown in FIG. 10, in each charging sub-phase t, one of two rows of sub-pixels 1 corresponding to two gate lines 2 coupled to one first control sub-circuit 8 are turned on, and one sub-pixel 1 in each repeating unit D is charged. That is, the two rows of sub-pixels 1 controlled by the two gate lines 2 are divided into m repeating units D. In the m repeating units D, a total of m sub-pixels 1 are charged with a voltage in each charging sub-phase t. In the six charging sub-phases included in one charging phase, six sub-pixels 1 in each of the m repeating units D are sequentially charged with voltages.

A voltage of the data signal transmitted by each data signal transmission channel 6 switches between a positive voltage and a negative voltage. The duration of the positive voltage and the duration of the negative voltage are each three charging sub-phases t, and voltages of data signals transmitted by any two adjacent data signal transmission channels 6 have opposite polarities in a same charging sub-phase.

For example, as shown in FIGS. 8 and 9, in each charging phase T, a timing of a data signal Source1 transmitted by the first data signal transmission channel 6 is that, the voltage of the data signal Source1 in the first three charging sub-phases t1 to t3 is a positive voltage, and the voltage of the data signal Source1 in the last three charging sub-phases t4 to t6 is a negative voltage. A timing of a data signal Source2 transmitted by the second data signal transmission channel 6 is that, the voltage of the data signal Source2 in the first three charging sub-phases t1 to t3 is a negative voltage, and the voltage of the data signal Source2 in the last three charging sub-phases t4 to t6 is a positive voltage. That is, the polarity of voltage of the data signal transmitted by each data signal transmission channel 6 is switched once every three charging sub-phases t.

Based on the switching manner of the voltage polarity of the data signal, by adopting the dot inversion driving manner, in the first three charging sub-phases t1 to t3 of each charging phase T, three sub-pixels 1 charged in each repeating unit D are not adjacent to each other, and the charged voltages are all positive voltages or are all negative voltages; and in the last three charging sub-phases t4 to t6 of each charging phase T, three sub-pixels 1 charged in each repeating unit D are not adjacent to each other, and the charged voltages are all negative voltages or are all positive voltages. Therefore, in each repeating unit D, the charged voltages in every two adjacent sub-pixels 1 have opposite polarities. Moreover, since the voltages of the data signals transmitted by any two adjacent data signal transmission channels 6 have opposite polarities in the same charging sub-phase, in every two adjacent repeating units D in the row direction, the charged voltages of sub-pixels 1 at a corresponding position have opposite polarities. In this way, in one frame period, after all the sub-pixels 1 are charged, the charged voltages of every two adjacent sub-pixels 1 have opposite polarities, thereby achieving the dot inversion of the sub-pixels 1.

It can be seen that, in the method for driving the array substrate 20, one frame period includes n charging phases T, and in each charging phase T, two rows of sub-pixels 1 controlled by two gate lines 2 that are coupled to one first control sub-circuit 8 are charged; in each charging sub-phase t, one sub-pixel 1 in each repeating unit D corresponding to two rows of sub-pixels 1 is charged. Therefore, six sub-pixels 1 in each of the repeating units D corresponding to two rows of sub-pixels 1 are charged in one charging phase T, and all the sub-pixels 1 in the array substrate 20 are charged in one frame period.

Moreover, in the above driving method, the polarity of the voltage of the data signal transmitted by each data signal transmission channel 6 is switched once every three charging sub-phases t. That is, in each charging phase T, the positive/negative polarity of the voltage of the data signal transmitted by each data signal transmission channel 6 is switched after three sub-pixels 1 are charged each time, so that an interval time for the voltage on each data line 3 to switch is charging duration of three sub-pixels 1 in one repeating unit D. Compared with a situation that in the array substrate 20' in the related art, the positive/negative polarity of the voltage on each data line 3 is switched after one sub-pixel 1 is charged each time, in the method for driving the array substrate 20 provided in the present disclosure, a switching frequency of the positive/negative polarity of the voltage on each data line 3 is reduced, so that a power consumption of the display apparatus may be reduced.

In other words, in the array substrate 20 provided by the present disclosure, every three data lines 3 correspond to one data signal transmission channel 6, and the polarity of the voltage of the data signal transmitted by each data signal transmission channel 6 is switched once every three charging sub-phases t, and three data lines respectively receive the data signal in the three charging sub-phases t. Therefore, comparing the method for driving the array substrate 20 provided in the present disclosure with the method for driving the array substrate 20' in the related art, in a case of charging the same number of sub-pixels, a switching frequency of the positive/negative polarity of the voltage on each data line in the present disclosure is one third of the switching frequency of the positive/negative polarity of the voltage on each data line in the related art.

Therefore, the method for driving the array substrate 20 provided by some embodiments of the present disclosure may reduce the switching frequency of the positive/negative polarity of the voltage of the data signal transmitted by each data signal transmission channel 6 on a basis of improving the flicker and crosstalk by using the dot inversion driving manner and improving the display effect, so that the switching frequency of the polarity of the voltage on a corresponding data line 3 may be reduced, and thereby achieving an effect of reducing the power consumption of the display panel.

In some embodiments, an exemplary method for driving the array substrate 20 includes the following steps.

As shown in FIGS. 4 and 10, with the first four rows and the first six columns of sub-pixels 1 in the array substrate 20 as an example, the twenty-four sub-pixels 1 are divided into four repeating units D. In an order from left to right and from top to bottom, the four repeating units D are a first repeating unit D1, a second repeating unit D2, a third repeating unit D3, and a fourth repeating unit D4, and the six sub-pixels 1 included in each repeating unit D are a first sub-pixel 11, a second sub-pixel 12, a third sub-pixel 13, a fourth sub-pixel 14, a fifth sub-pixel 15 and a sixth sub-pixel 16.

For example, as shown in FIG. 10, an upper left sub-pixel in each repeating unit D is taken as the first sub-pixel 11, and other five sub-pixels are sequentially numbered as the second sub-pixel 12, the third sub-pixel 13, the fourth sub-pixel 14, the fifth sub-pixel 15 and the sixth sub-pixel 16 in the order from left to right and from top to bottom. Corresponding to a numbering order of the sub-pixels, the first gate line 2 and the second gate line 2 of the two gate lines 2 mentioned below are numbered in an order from top to bottom, and the first data line 3, the second data line 3, and the third data line 3 of the three data lines 3 are numbered in an order from left to right.

As shown in FIGS. 8 and 9, the six charging sub-phases t included in each charging phase T are a first charging sub-phase t1, a second charging sub-phase t2, a third charging sub-phase t3, a fourth charging sub-phase t4, a fifth charging sub-phase t5 and a sixth charging sub-phase t6. In the following, the first charging phase T1 is taken as an example, and the six charging sub-phases t included in the first charging phase T1 will be described.

In the first charging sub-phase t1:

the first first control sub-circuit 8 transmits a scanning signal Gate1 from the first scan signal transmission channel 4 to the first gate line 2 of two gate lines 2 coupled thereto under control of the scan control signal transmitted by the at least one scan control signal line 5, so as to turn on a row of sub-pixels 1 controlled by the first gate line 2 (i.e., the first row of sub-pixels 1 in FIG. 10);

each second control sub-circuit 9 transmits the data signal from the data signal transmission channel 6 to the first data line 3 of the three data lines 3 couple to the repeating unit D under control of the data control signal transmitted by the at least one data control signal line 7, so as to charge the first sub-pixel 11 in the repeating unit D.

For example, as shown in FIGS. 4 and 10, the first second control sub-circuit 9 transmits the data signal Source1 from the first data signal transmission channel 6 to the first data line 3 of three data lines 3 coupled to the first repeating unit D1 under control of the data control signal transmitted by the at least one data control signal line 7, so as to charge the first sub-pixel 11 in the first repeating unit D1 and charge it with a positive voltage. Simultaneously, the second second control sub-circuit 9 transmits the data signal Source2 from the second data signal transmission channel 6 to the first data line 3 of three data lines 3 coupled to the second repeating unit D2 under control of the data control signal transmitted by the at least one data control signal line 7, so as to charge the first sub-pixel 11 in the second repeating unit D2 and charge it with a negative voltage.

In the second charging sub-phase t2:

the first first control sub-circuit 8 transmits the scanning signal Gate1 from the first scan signal transmission channel 4 to the first gate line 2 of the two gate lines 2 coupled thereto under control of the scan control signal transmitted by the at least one scan control signal line 5, so as to turn on the row of sub-pixels 1 controlled by the first gate line 2 (i.e., the first row of sub-pixels 1 in FIG. 10);

each second control sub-circuit 9 transmits the data signal from the data signal transmission channel 6 to the third data lines 3 of the three data line 3 couple to the repeating unit D under control of the data control signal transmitted by the at least one data control signal line 7, so as to charge the third sub-pixel 13 in the repeating unit D.

For example, as shown in FIGS. 4 and 10, the first second control sub-circuit 9 transmits the data signal Source1 from the first data signal transmission channel 6 to the third data line 3 of the three data lines 3 coupled to the first repeating unit D1 under control of the data control signal transmitted by the at least one data control signal line 7, so as to charge the third sub-pixel 13 in the first repeating unit D1 and charge it with a positive voltage. Simultaneously, the second second control sub-circuit 9 transmits the data signal Source2 from the second data signal transmission channel 6 to the third data line 3 of the three data lines 3 coupled to the second repeating unit D2 under control of the data control signal transmitted by the at least one data control signal line 7, so as to charge the third sub-pixel 13 in the second repeating unit D2 and charge it with a negative voltage.

In the third charging sub-phase t3:

the first first control sub-circuit 8 transmits the scanning signal Gate1 from the first scan signal transmission channel 4 to the second gate line 2 of the two gate lines 2 coupled thereto under control of the scan control signal transmitted by the at least one scan control signal line 5, so as to turn on a row of sub-pixels 1 controlled by the second gate line 2 (i.e., the second row of sub-pixels 1 in FIG. 10);

each second control sub-circuit 9 transmits the data signal from the data signal transmission channel 6 to the second data line 3 of the three data lines 3 couple to the repeating unit D under control of the data control signal transmitted by the at least one data control signal line 7, so as to charge the fifth sub-pixel 15 in the repeating unit D.

For example, as shown in FIGS. 4 and 10, the first second control sub-circuit 9 transmits the data signal Source1 from the first data signal transmission channel 6 to the second data line 3 of the three data lines 3 coupled to the first repeating unit D1 under control of the data control signal transmitted by the at least one data control signal line 7, so as to charge the fifth sub-pixel 15 in the first repeating unit D1 and charge it with a positive voltage. Simultaneously, the second second control sub-circuit 9 transmits the data signal Source2 from the second data signal transmission channel 6 to the second data line 3 of the three data lines 3 coupled to the second repeating unit D2 under control of the data control signal transmitted by the at least one data control signal line 7, so as to charge the fifth sub-pixel 15 in the second repeating unit D2 and charge it with a negative voltage.

In the fourth charging sub-phase t4:

the first first control sub-circuit 8 transmits the scanning signal Gate1 from the first scan signal transmission channel 4 to the second gate line 2 of the two gate lines 2 coupled thereto under control of the scan control signal transmitted by the at least one scan control signal line 5, so as to turn on the row of sub-pixels 1 controlled by the second gate line 2 (i.e., the second row of sub-pixels 1 in FIG. 10);

each second control sub-circuit 9 transmits the data signal from the data signal transmission channel 6 to the first data line 3 of the three data lines 3 couple to the repeating unit D under control of the data control signal transmitted by the at least one data control signal line 7, so as to charge the fourth sub-pixel 14 in the repeating unit D.

For example, as shown in FIGS. 4 and 10, the first second control sub-circuit 9 transmits the data signal Source1 from the first data signal transmission channel 6 to the first data line 3 of the three data lines 3 coupled to the first repeating unit D1 under control of the data control signal transmitted by the at least one data control signal line 7, so as to charge the fourth sub-pixel 14 in the first repeating unit D1 and charge it with a negative voltage. Simultaneously, the second second control sub-circuit 9 transmits the data signal Source2 from the second data signal transmission channel 6 to the first data line 3 of the three data lines 3 coupled to the second repeating unit D2 under control of the data control signal transmitted by the at least one data control signal line 7, so as to charge the fourth sub-pixel 14 in the second repeating unit D2 and charge it with a positive voltage.

In the fifth charging sub-phase t5:

the first first control sub-circuit 8 transmits the scanning signal Gate1 from the first scan signal transmission channel 4 to the second gate line 2 of the two gate lines 2 coupled thereto under control of the scan control signal transmitted by the at least one scan control signal line 5, so as to turn on the row of sub-pixels 1 controlled by the second gate line 2 (i.e., the second row of sub-pixels 1 in FIG. 10);

each second control sub-circuit 9 transmits the data signal from the data signal transmission channel 6 to the third data line 3 of the three data lines 3 couple to the repeating unit D under control of the data control signal transmitted by the at least one data control signal line 7, so as to charge the sixth sub-pixel 16 in the repeating unit D.

For example, as shown in FIGS. 4 and 10, the first second control sub-circuit 9 transmits the data signal Source1 from the first data signal transmission channel 6 to the third data line 3 of the three data lines 3 coupled to the first repeating unit D1 under control of the data control signal transmitted by the at least one data control signal line 7, so as to charge the sixth sub-pixel 16 in the first repeating unit D1 and charge it with a negative voltage. Simultaneously, the second second control sub-circuit 9 transmits the data signal Source2 from the second data signal transmission channel 6 to the third data line 3 of the three data lines 3 coupled to the second repeating unit D2 under control of the data control signal transmitted by the at least one data control signal line 7, so as to charge the sixth sub-pixel 16 in the second repeating unit D2 and charge it with a positive voltage.

In the sixth charging sub-phase t6:

the first first control sub-circuit 8 transmits the scanning signal Gate1 from the first scan signal transmission channel 4 to the first gate line 2 of the two gate lines 2 coupled thereto under control of the scan control signal transmitted by the at least one scan control signal line 5, so as to turn on the row of sub-pixels 1 controlled by the first gate line 2 (i.e., the first row of sub-pixels 1 in FIG. 10);

each second control sub-circuit 9 transmits the data signal from the data signal transmission channel 6 to the second data line 3 of the three data lines 3 couple to the repeating unit D under control of the data control signal transmitted by the at least one data control signal line 7, so as to charge the second sub-pixel 12 in the repeating units D.

For example, as shown in FIGS. 4 and 10, the first second control sub-circuit 9 transmits the data signal Source1 from the first data signal transmission channel 6 to the second data line 3 of the three data lines 3 coupled to the first repeating unit D1 under control of the data control signal transmitted by the at least one data control signal line 7, so as to charge the second sub-pixel 12 in the first repeating unit D1 and charge it with a negative voltage. Simultaneously, the second second control sub-circuit 9 transmits the data signal Source2 from the second data signal transmission channel 6 to the second data line 3 of the three data lines 3 coupled to the second repeating unit D2 under control of the data control signal transmitted by the at least one data control signal line 7, so as to charge the second sub-pixel 12 in the second repeating unit D2 and charge it with a positive voltage.

In this way, in the first charging phase T1, two rows of sub-pixels 1 corresponding to the first scan signal transmission channel 4 are charged, and among the plurality of repeating units D divided by the two rows of sub-pixels 1, six sub-pixels 1 of each repeating unit D are sequentially charged in an order of the first sub-pixel 11, the third sub-pixel 13, the fifth sub-pixel 15, the fourth sub-pixel 14, the sixth sub-pixel 16, and the second sub-pixel 12.

Moreover, in an odd-numbered repeating unit D, the first sub-pixel 11, the third sub-pixel 13 and the fifth sub-pixel 15 are charged with a first voltage (e.g., a positive voltage), and the second sub-pixel 12, the fourth sub-pixel 14 and the sixth sub-pixel 16 are charged with a second voltage (e.g., a negative voltage). In an even-numbered repeating unit D, the first sub-pixel 11, the third sub-pixel 13 and the fifth sub-pixel 15 are charged with the second voltage (e.g., the negative voltage), and the second sub-pixel 12, the fourth sub-pixel 14 and the sixth sub-pixel 16 are charged with the first voltage (e.g., the positive voltage). The first voltage and the second voltage have opposite polarities.

For the second charging phase T2 to the n-th charging phase Tn in one frame period, reference may be, combined with FIGS. 4, and 8 to 10, made to the description of the first charging phase T1, which will not be repeated herein. In this way, in one frame period, the dot inversion of all sub-pixels 1 in the array substrate 20 may be achieved.

Figure 5:
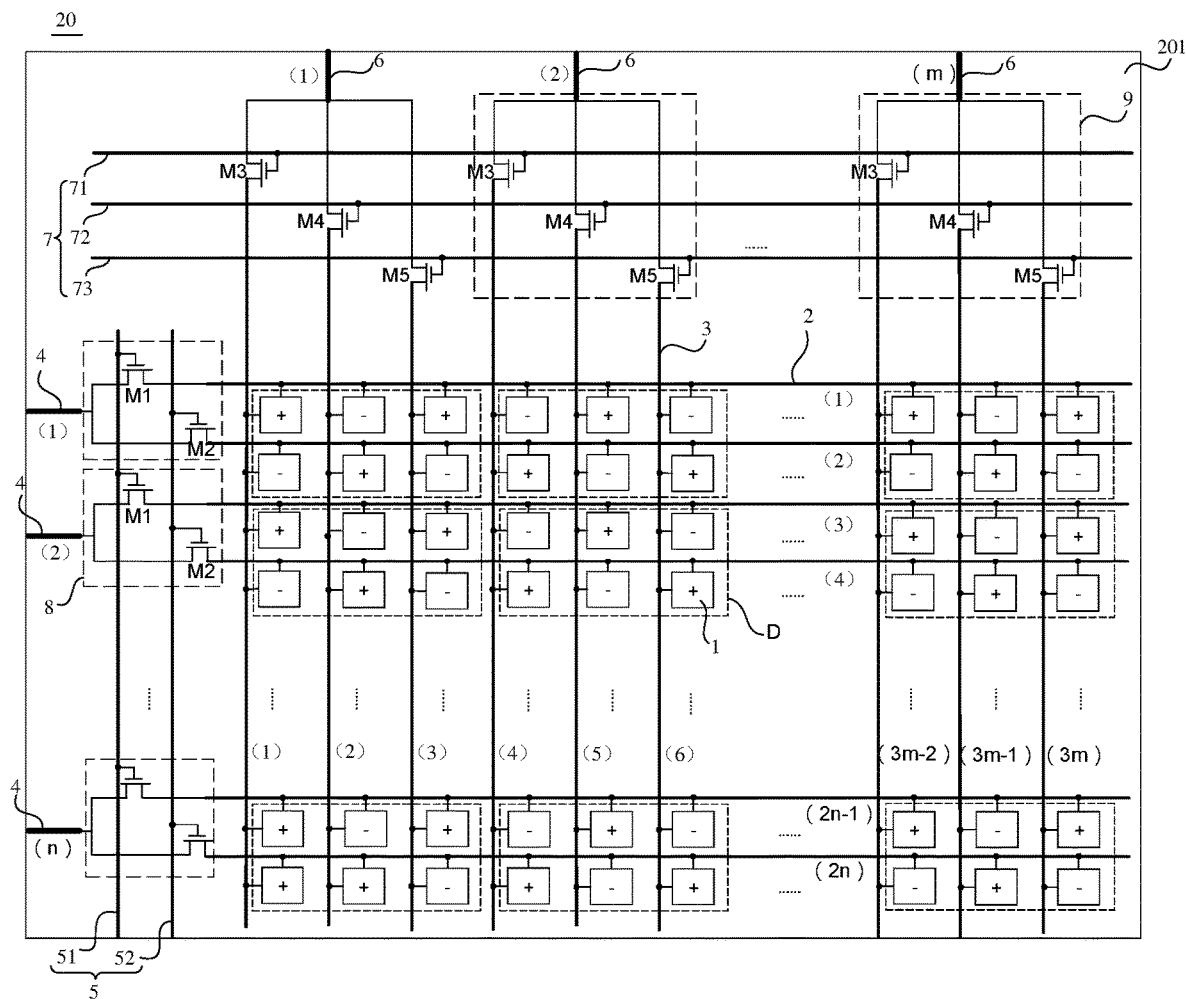
FIG. 5 is a diagram showing a structure of another array substrate, in accordance with some embodiments of the present disclosure.
Figure 6:
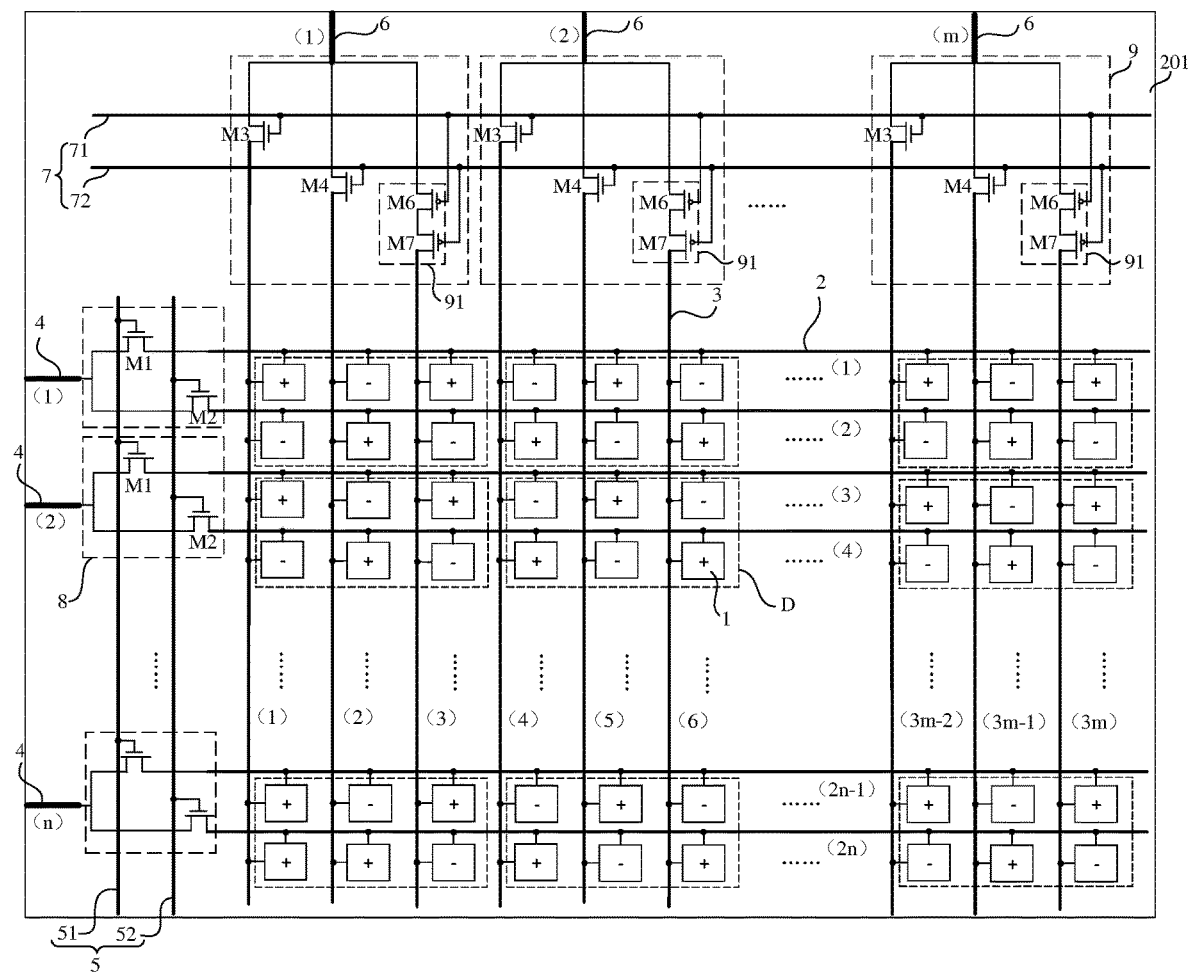
FIG. 6 is a diagram showing a structure of yet another array substrate, in accordance with some embodiments of the present disclosure.
Figure 7:
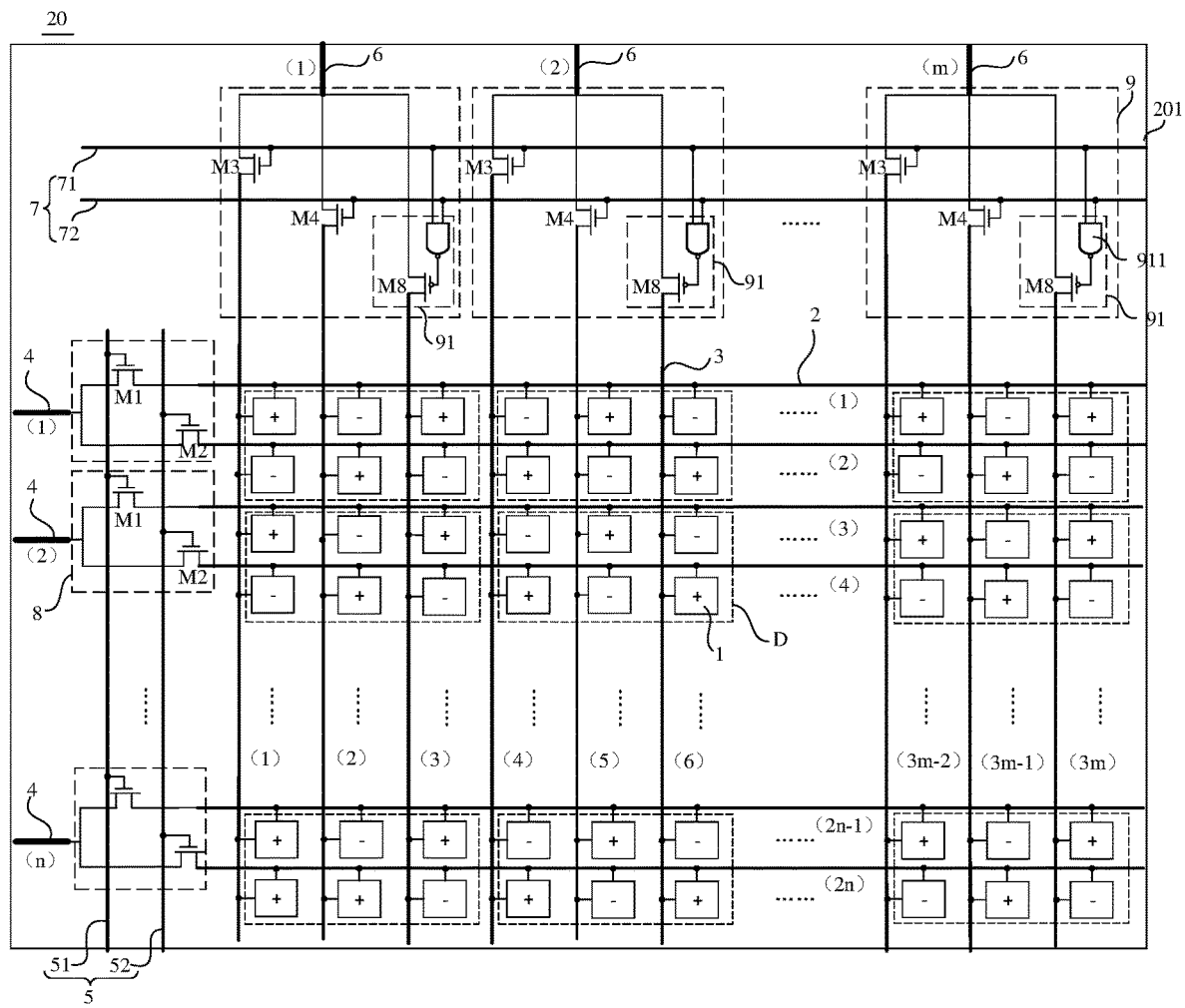
FIG. 7 is a diagram showing a structure of yet another array substrate, in accordance with some embodiments of the present disclosure.

In some embodiments, as shown in FIGS. 5 to 7, the at least one scan control signal line 5 includes a first scan control signal line 51 and a second scan control signal line 52, and each first control sub-circuit 8 includes a first transistor M1 and a second transistor M2.

A control electrode of the first transistor M1 is coupled to the first scan control signal line 51, a first electrode of the first transistor M1 is coupled to the scan signal transmission channel 4 coupled to the first control sub-circuit 8, and a second electrode of the first transistor M1 is coupled to one of the two gate lines 2 coupled to the first control sub-circuit 8. The first transistor M1 is configured to be turned on under control of a first scan control signal GEN-1 transmitted by the first scan control signal line 51, and transmit the scanning signal transmitted by the scan signal transmission channel 4 coupled thereto to one gate line 2 coupled thereto.

A control electrode of the second transistor M2 is coupled to the second scan control signal line 52, a first electrode of the second transistor M2 is coupled to the scan signal transmission channel 4 coupled to the first control sub-circuit 8, and a second electrode of the second transistor M2 is coupled to another of the two gate lines 2 coupled to the first control sub-circuit 8. The second transistor M2 is configured to be turned on under control of a second scan control signal GEN-2 transmitted by the second scan control signal line 52, and transmit the scanning signal transmitted by the scan signal transmission channel 4 coupled thereto to another gate line 2 coupled thereto.

In the above embodiments, in each charging phase T, a driving process of the first transistor M1 and the second transistor M2 of a corresponding first control sub-circuit 8 is as follows.

In the first charging sub-phase t1, the second charging sub-phase t2 and the sixth charging sub-phase t6, the first transistor M1 in the first control sub-circuit 8 is turned on under control of the first scan control signal GEN-1 transmitted by the first scan control signal line 51, and transmits the scanning signal from the scan signal transmission channel 4 to the first gate line 2 coupled thereto.

In the third charging sub-phase t3, the fourth charging sub-phase t4 and the fifth charging sub-phase t5, the second transistor M2 in the first control sub-circuit 8 is turned on under control of the second scan control signal GEN-2 transmitted by the second scan control signal line 52, and transmits the scanning signal from the scan signal transmission channel 4 to the second gate line 2 coupled thereto.

In some embodiments, as shown in FIGS. 5 to 7, the at least one data control signal line 7 includes a first data control signal line 71 and a second data control signal line 72, and each second control sub-circuit 9 includes a third transistor M3 and a fourth transistor M4.

A control electrode of the third transistor M3 is coupled to the first data control signal line 71, a first electrode of the third transistor M3 is coupled to the data signal transmission channel 6 coupled to the second control sub-circuit 9, and a second electrode of the third transistor M3 is coupled to the first data line 3 of the three data lines 3 coupled to the second control sub-circuit 9. The third transistor M3 is configured to be turned on under control of a first data control signal SEN-1 transmitted by the first data control signal line 71, and transmit the data signal transmitted by the data signal transmission channel 6 coupled thereto to the first data line 3 coupled thereto.

A control electrode of the fourth transistor M4 is coupled to the second data control signal line 72, a first electrode of the fourth transistor M4 is coupled to the data signal transmission channel 6 coupled to the second control sub-circuit 9, and a second electrode of the fourth transistor M4 is coupled to the second data line 3 of the three data lines 3 coupled to the second control sub-circuit 9. The fourth transistor M4 is configured to be turned on under control of a second data control signal SEN-2 transmitted by the second data control signal line 72, and transmit the data signal transmitted by the data signal transmission channel 6 coupled thereto to the second data line 3 coupled thereto.

In some embodiments, as shown in FIG. 5, in the array substrate 20, on a basis that each first control sub-circuit 8 includes the first transistor M1 and the second transistor M2, and each second control sub-circuit 9 includes the third transistor M3 and the fourth transistor M4, the at least one data control signal line 7 further includes a third data control signal line 73, and each second control sub-circuit 9 further includes a fifth transistor M5.

A control electrode of the fifth transistor M5 is coupled to the third data control signal line 73, a first electrode of the fifth transistor M5 is coupled to the data signal transmission channel 6 coupled to the second control sub-circuit 9, and a second electrode of the fifth transistor M5 is coupled to the third data line 3 of the three data lines 3 coupled to the second control sub-circuit 9. The fifth transistor M5 is configured to be turned on under control of a third data control signal SEN-3 transmitted by the third data control signal line 73, and transmit the data signal transmitted by the data signal transmission channel 6 coupled thereto to the third data line 3 coupled thereto.

For the array substrate 20 shown in FIG. 5, in combination with the timing diagram shown in FIG. 8, the driving method includes the following steps.

One frame period includes n charging phases T, and each charging phase T includes six charging sub-phases t. In the following, the first charging phase T1 and the second charging phase T2 are taken as an example for description, in which the first transistor M1 and the second transistor M2 included in the first control sub-circuit 8, and the third transistor M3, the fourth transistor M4 and the fifth transistor M5 included in the second control sub-circuit 9 are all N-type transistors.

In the first charging phase T1, the first scan signal transmission channel 4 transmits the scanning signal Gate1 and charges two corresponding rows of sub-pixels 1 (i.e., the first row of sub-pixels 1 and the second row of sub-pixels 1). The repeating units D divided by the two rows of sub-pixels 1 are the first repeating unit D1 to the m-th repeating unit D from left to right. Hereinafter, the p-th charging sub-phase tp of the k-th charging phase Tk is represented by Tk(tp), and k and p are both positive integers.

In T1(t1), the first transistor M1 in the first first control sub-circuit 8 is turned on under control of the first scan control signal GEN-1 transmitted by the first scan control signal line 51, and transmits the scanning signal from the first scan signal transmission channel 4 to the gate line 2 coupled thereto (i.e., the first gate line 2), so as to turn on the first row of sub-pixels 1.

The third transistor M3 in each second control sub-circuit 9 is turned on under control of the first data control signal SEN-1 transmitted by the first data control signal line 71, and transmits the data signal from the data signal transmission channel 6 to the first data line 3 of the three data lines 3 corresponding to the repeating unit D, so as to charge the first sub-pixel 11 in the repeating unit D.

As shown in FIGS. 5 and 8, in T1(t1), the level of the first data control signal SEN-1 is a high level, so that the third transistor M3 in the first second control sub-circuit 9 is turned on. The third transistor M3 transmits the data signal Source1 from the first data signal transmission channel 6 to the first data line 3 of the three data lines 3 corresponding to the first repeating unit D1, so as to charge the first sub-pixel 11 in the first repeating unit D1. Moreover, the voltage of the data signal Source1 in T1(t1) is a positive voltage, so that the first sub-pixel 11 in the first repeating unit D1 is charged with the positive voltage. Simultaneously, the third transistor M3 in the second second control sub-circuit 9 is turned on, and transmits the data signal Source2 from the second data signal transmission channel 6 to the first data line 3 of the three data lines 3 corresponding to the second repeating unit D2, so as to charge the first sub-pixel 11 in the second repeating unit D2. Moreover, the voltage of the data signal Source2 in T1(t1) is a negative voltage, so that the first sub-pixel 11 in the second repeating unit D2 is charged with the negative voltage.

In T1(t2), the first transistor M1 in the first first control sub-circuit 8 is turned on under control of the first scan control signal GEN-1 transmitted by the first scan control signal line 51, and transmits the scanning signal from the first scan signal transmission channel 4 to the gate line 2 coupled thereto (i.e., the first gate line 2), so as to turn on the first row of sub-pixels 1.

The fifth transistor M5 in each second control sub-circuit 9 is turned on under control of the third data control signal SEN-3 transmitted by the third data control signal line 73, and transmits the data signal from the data signal transmission channel 6 to the third data line 3 of the three data lines 3 corresponding to the repeating unit D, so as to charge the third sub-pixel 13 in the repeating unit D.

As shown in FIGS. 5 and 8, in T1(t2), the level of the third data control signal SEN-3 is a high level, so that the fifth transistor M5 in the first second control sub-circuit 9 is turned on. The fifth transistor M5 transmits the data signal Source1 from the first data signal transmission channel 6 to the third data line 3 of the three data lines 3 corresponding to the first repeating unit D1, so as to charge the third sub-pixel 13 in the first repeating unit D1. Moreover, the voltage of the data signal Source1 in T1(t2) is a positive voltage, so that the third sub-pixel 13 in the first repeating unit D1 is charged with the positive voltage. Simultaneously, the fifth transistor M5 in the second second control sub-circuit 9 is turned on, and transmits the data signal Source2 from the second data signal transmission channel 6 to the third data line 3 of the three data lines 3 corresponding to the second repeating unit D2, so as to charge the third sub-pixel 13 in the second repeating unit D2. Moreover, the voltage of the data signal Source2 in T1(t2) is a negative voltage, so that the third sub-pixel 13 in the second repeating unit D2 is charged with the negative voltage.

In T1(t3), the second transistor M2 in the first first control sub-circuit 8 is turned on under control of the second scan control signal GEN-2 transmitted by the second scan control signal line 52, and transmits the scanning signal from the first scan signal transmission channel 4 to the gate line 2 coupled thereto (i.e., the second gate line 2), so as to turn on the second row of sub-pixels 1.

The fourth transistor M4 in each second control sub-circuit 9 is turned on under control of the second data control signal SEN-2 transmitted by the second data control signal line 72, and transmits the data signal from the data signal transmission channel 6 to the second data line 3 of the three data lines 3 corresponding to the repeating unit D, so as to charge the fifth sub-pixel 15 in the repeating unit D.

As shown in FIGS. 5 and 8, in T1(t3), the level of the second data control signal SEN-2 is a high level, so that the fourth transistor M4 in the first second control sub-circuit 9 is turned on. The fourth transistor M4 transmits the data signal Source1 from the first data signal transmission channel 6 to the second data line 3 of the three data lines 3 corresponding to the first repeating unit D1, so as to charge the fifth sub-pixel 15 in the first repeating unit D1. Moreover, the voltage of the data signal Source1 in T1(t3) is a positive voltage, so that the fifth sub-pixel 15 in the first repeating unit D1 is charged with the positive voltage. Simultaneously, the fourth transistor M4 in the second second control sub-circuit 9 is turned on, and transmits the data signal Source2 from the second data signal transmission channel 6 to the second data line 3 of the three data lines 3 corresponding to the second repeating unit D2, so as to charge the fifth sub-pixel 15 in the second repeating unit D2. Moreover, the voltage of the data signal Source2 in T1(*t*3) is a negative voltage, so that the fifth sub-pixel 15 in the second repeating unit D2 is charged with the negative voltage.

In T1(*t*4), the second transistor M2 in the first first control sub-circuit 8 is turned on under control of the second scan control signal GEN-2 transmitted by the second scan control signal line 52, and transmits the scanning signal from the first scan signal transmission channel 4 to the gate line 2 coupled thereto (i.e., the second gate line 2), so as to turn on the second row of sub-pixels 1.

The third transistor M3 in each second control sub-circuit 9 is turned on under control of the first data control signal SEN-1 transmitted by the first data control signal line 71, and transmits the data signal from the data signal transmission channel 6 to the first data lines 3 of the three data lines 3 corresponding to the repeating unit D, so as to charge the fourth sub-pixel 14 in the repeating unit D.

As shown in FIGS. 5 and 8, in T1(*t*4), the level of the first data control signal SEN-1 is a high level, so that the third transistor M3 in the first second control sub-circuit 9 is turned on. The third transistor M3 transmits the data signal Source1 from the first data signal transmission channel 6 to the first data line 3 of the three data lines 3 corresponding to the first repeating unit D1, so as to charge the fourth sub-pixel 14 in the first repeating unit D1. Moreover, the voltage of the data signal Source1 in T1(*t*4) is a negative voltage, so that the fourth sub-pixel 14 in the first repeating unit D1 is charged with the negative voltage. Simultaneously, the third transistor M3 in the second second control sub-circuit 9 is turned on, and transmits the data signal Source2 from the second data signal transmission channel 6 to the first data line 3 of the three data lines 3 corresponding to the second repeating unit D2, so as to charge the fourth sub-pixel 14 in the second repeating unit D2. Moreover, the voltage of the data signal Source2 in T1(*t*4) is a positive voltage, so that the fourth sub-pixel 14 in the second repeating unit D2 is charged with the positive voltage.

In T1(*t*5), the second transistor M2 in the first first control sub-circuit 8 is turned on under control of the second scan control signal GEN-2 transmitted by the second scan control signal line 52, and transmits the scanning signal from the first scan signal transmission channel 4 to the gate line 2 coupled thereto (i.e., the second gate line 2), so as to turn on the second row of sub-pixels 1.

The fifth transistor M5 in each second control sub-circuit 9 is turned on under control of the third data control signal SEN-3 transmitted by the third data control signal line 73, and transmits the data signal from the data signal transmission channel 6 to the third data line 3 of the three data lines 3 corresponding to the repeating unit D, so as to charge the sixth sub-pixel 16 in the repeating unit D.

As shown in FIGS. 5 and 8, in T1(*t*5), the level of the third data control signal SEN-3 is a high level, so that the fifth transistor M5 in the first second control sub-circuit 9 is turned on. The fifth transistor M5 transmits the data signal Source1 from the first data signal transmission channel 6 to the third data line 3 of the three data lines 3 corresponding to the first repeating unit D1, so as to charge the sixth sub-pixel 16 in the first repeating unit D1. Moreover, the voltage of the data signal Source1 in T1(*t*5) is a negative voltage, so that the sixth sub-pixel 16 in the first repeating unit D1 is charged with the negative voltage. Simultaneously, the fifth transistor M5 in the second second control sub-circuit 9 is turned on, and transmits the data signal Source2 from the second data signal transmission channel 6 to the third data line 3 of the three data lines 3 corresponding to the second repeating unit D2, so as to charge the sixth sub-pixel 16 in the second repeating unit D2. Moreover, the voltage of the data signal Source2 in T1(*t*5) is a positive voltage, so that the sixth sub-pixel 16 in the second repeating unit D2 is charged with the positive voltage.

In T1(*t*6), the first transistor M1 in the first first control sub-circuit 8 is turned on under control of the first scan control signal GEN-1 transmitted by the first scan control signal line 51, and transmits the scanning signal from the first scan signal transmission channel 4 to the gate line 2 coupled thereto (i.e., the first gate line 2), so as to turn on the first row of sub-pixels 1.

The fourth transistor M4 in each second control sub-circuit 9 is turned on under control of the second data control signal SEN-2 transmitted by the second data control signal line 72, and transmits the data signal from the data signal transmission channel 6 to the second data line 3 of the three data lines 3 corresponding to the repeating unit D, so as to charge the second sub-pixel 12 in the repeating unit D.

As shown in FIGS. 5 and 8, in T1(*t*6), the level of the second data control signal SEN-2 is a high level, so that the fourth transistor M4 in the first second control sub-circuit 9 is turned on. The fourth transistor M4 transmits the data signal Source1 from the first data signal transmission channel 6 to the second data line 3 of the three data lines 3 corresponding to the first repeating unit D1, so as to charge the second sub-pixel 12 in the first repeating unit D1. Moreover, the voltage of the data signal Source1 in T1(*t*6) is a negative voltage, so that the second sub-pixel 12 in the first repeating unit D1 is charged with the negative voltage. Simultaneously, the fourth transistor M4 in the second second control sub-circuit 9 is turned on, and transmits the data signal Source2 from the second data signal transmission channel 6 to the second data line 3 of the three data lines 3 corresponding to the second repeating unit D2, so as to charge the second sub-pixel 12 in the second repeating unit D2. Moreover, the voltage of the data signal Source2 in T1(*t*6) is a positive voltage, so that the second sub-pixel 12 in the second repeating unit D2 is charged with the positive voltage.

In the second charging phase T2, the second scan signal transmission channel 4 transmits the scanning signal Gate2, and charges two corresponding rows of sub-pixels 1 (i.e., a third row of sub-pixels 1 and a fourth row of sub-pixels 1). For the driving process of six charging sub-phases in the second charging phase T2, reference may be, combined with the timing diagram shown in FIG. 8, made to the above description of the six charging sub-phases in the first charging phase T1, which will not be repeated herein.

In some examples, the first transistor M1 and the second transistor M2 included in the first control sub-circuit 8, and the third transistor M3, the fourth transistor M4 and the fifth transistor M5 included in the second control sub-circuit 9 are all P-type transistors, and timings of the first scan control signal GEN-1, the second scan control signal GEN-2, the first data control signal SEN-1, the second data control signal SEN-2, and the third data control signal SEN-3 corresponding thereto may be reversed on the basis of the timings shown in FIG. 8.

In some embodiments, as shown in FIGS. 6 and 7, in the array substrate 20, on the basis that each first control sub-circuit 8 includes the first transistor M1 and the second transistor M2, and each second control sub-circuit 9 includes the third transistor M3 and the fourth transistor M4, each second control sub-circuit 9 further includes a switching unit 91.

The switching unit 91 of the second control sub-circuit 9 is coupled to the first data control signal line 71 and the second data control signal line 72. The switching unit 91 is also coupled to the data signal transmission channel 6 coupled to the second control sub-circuit 9 and the third data line 3 of the three data lines 3 coupled to the second control sub-circuit 9.

The switching unit 91 is configured to transmit the data signal transmitted by the data signal transmission channel 6 coupled thereto to the data line 3 coupled thereto under control of the first data control signal SEN-1 transmitted by the first data control signal line 71 and the second data control signal SEN-2 transmitted by the second data control signal line 72.

As shown in FIG. 6, in some examples, the switching unit 91 includes a sixth transistor M6 and a seventh transistor M7.

A control electrode of the sixth transistor M6 is coupled to the first data control signal line 71, a first electrode of the sixth transistor M6 is coupled to the data signal transmission channel 6 coupled to the switching unit 91, and a second electrode of the sixth transistor M6 is coupled to a first electrode of the seventh transistor M7.

A control electrode of the seventh transistor M7 is coupled to the second data control signal line 72, and a second electrode of the seventh transistor M7 is coupled to the data line 3 coupled to the switching unit 91.

In the switching unit 91, in a case where the sixth transistor M6 is turned on under control of the first data control signal SEN-1 transmitted by the first data control signal line 71, and the seventh transistor M7 is turned on under control of the second data control signal SEN-2 transmitted by the second data control signal line 72, the data signal transmitted by the data signal transmission channel 6 that is coupled to the switching unit 91 may be transmitted to the data line 3 coupled thereto.

In some embodiments, the sixth transistor M6 and the seventh transistor M7 are of a same type, the third transistor M3 and the fourth transistor M4 are of a same type, and the type of the sixth transistor M6 and the seventh transistor M7 is different from the type of the third transistor M3 and the fourth transistor M4.

For example, as shown in FIG. 6, the third transistor M3 and the fourth transistor M4 are both N-type transistors, and the sixth transistor M6 and the seventh transistor M7 are both P-type transistors.

For the array substrate 20 shown in FIG. 6, in combination with the timing diagram shown in FIG. 9, the driving method includes the following steps.

One frame period includes n charging phases T, and each charging phase T includes six charging sub-phases t. In the following, the first charging phase T1 and the second charging phase T2 are taken as an example for description, in which the first transistor M1 and the second transistor M2 included in the first control sub-circuit 8 are both N-type transistors, the third transistor M3 and the fourth transistor M4 included in the second control sub-circuit 9 are both N-type transistors, and the sixth transistor M6 and the seventh transistor M7 included in the second control sub-circuit 9 are both P-type transistors.

In the first charging phase T1, the first scan signal transmission channel 4 transmits the scanning signal Gate1 and charges two corresponding rows of sub-pixels 1 (i.e., the first row of sub-pixels 1 and the second row of sub-pixels 1). The repeating units D divided by the two rows of sub-pixels 1 are the first repeating unit D1 to the m-th repeating unit D from left to right. Hereinafter, the p-th charging sub-phase tp of the k-th charging phase Tk is represented by Tk(tp), and k and p are both positive integers.

In T1(t1), the first transistor M1 in the first first control sub-circuit 8 is turned on under control of the first scan control signal GEN-1 transmitted by the first scan control signal line 51, and transmits the scanning signal from the first scan signal transmission channel 4 to the gate line 2 coupled thereto (i.e., the first gate line 2), so as to turn on the first row of sub-pixels 1.

The third transistor M3 in each second control sub-circuit 9 is turned on under control of the first data control signal SEN-1 transmitted by the first data control signal line 71, and transmits the data signal from the data signal transmission channel 6 to the first data line 3 of the three data lines 3 corresponding to the repeating unit D, so as to charge the first sub-pixel 11 in the repeating unit D.

As shown in FIGS. 6 and 9, in T1(t1), the level of the first data control signal SEN-1 is a high level, so that the third transistor M3 in the first second control sub-circuit 9 is turned on. The third transistor M3 transmits the data signal Source1 from the first data signal transmission channel 6 to the first data line 3 of the three data lines 3 corresponding to the first repeating unit D1, so as to charge the first sub-pixel 11 in the first repeating unit D1. Moreover, the voltage of the data signal Source1 in T1(t1) is a positive voltage, so that the first sub-pixel 11 in the first repeating unit D1 is charged with the positive voltage. Simultaneously, the third transistor M3 in the second second control sub-circuit 9 is turned on, and transmits the data signal Source2 from the second data signal transmission channel 6 to the first data line 3 of the three data lines 3 corresponding to the second repeating unit D2, so as to charge the first sub-pixel 11 in the second repeating unit D2. Moreover, the voltage of the data signal Source2 in T1(t1) is a negative voltage, so that the first sub-pixel 11 in the second repeating unit D2 is charged with the negative voltage.

In T1(t2), the first transistor M1 in the first first control sub-circuit 8 is turned on under control of the first scan control signal GEN-1 transmitted by the first scan control signal line 51, and transmits the scanning signal from the first scan signal transmission channel 4 to the gate line 2 coupled thereto (i.e., the first gate line 2), so as to turn on the first row of sub-pixels 1.

The switching unit 91 in each second control sub-circuit 9 is turned on under control of the first data control signal SEN-1 transmitted by the first data control signal line 71 and the second data control signal SEN-2 transmitted by the second data control signal line 72, and transmits the data signal from the data signal transmission channel 6 to the third data line 3 of the three data lines 3 corresponding to the repeating unit D, so as to charge the third sub-pixel 13 in the repeating unit D.

As shown in FIGS. 6 and 9, in T1(t2), the levels of the first data control signal SEN-1 and the second data control signal SEN-2 are both low levels, so that the sixth transistor M6 and the seventh transistor M7 in the switching unit 91 are both turned on in the first second control sub-circuit 9. The sixth transistor M6 and the seventh transistor M7 transmit the data signal Source1 from the first data signal transmission channel 6 to the third data line 3 of the three data lines 3 corresponding to the first repeating unit D1, so as to charge the third sub-pixel 13 in the first repeating unit D1. Moreover, the voltage of the data signal Source1 in T1(t2) is a positive voltage, so that the third sub-pixel 13 in the first repeating unit D1 is charged with the positive voltage. Simultaneously, the sixth transistor M6 and the seventh transistor M7 in the switching unit 91 are both turned on in the second second control sub-circuit 9, and transmit the data signal Source2 from the second data signal transmission channel 6 to the third data line 3 of the three data lines 3 corresponding to the second repeating unit D2, so as to charge the third sub-pixel 13 in the second repeating unit D2. Moreover, the voltage of the data signal Source2 in T1(*t*2) is a negative voltage, so that the third sub-pixel 13 in the second repeating unit D2 is charged with the negative voltage.

In T1(*t*3), the second transistor M2 in the first first control sub-circuit 8 is turned on under control of the second scan control signal GEN-2 transmitted by the second scan control signal line 52, and transmits the scanning signal from the first scan signal transmission channel 4 to the gate line 2 coupled thereto (i.e., the second gate line 2), so as to turn on the second row of sub-pixels 1.

The fourth transistor M4 in each second control sub-circuit 9 is turned on under control of the second data control signal SEN-2 transmitted by the second data control signal line 72, and transmits the data signal from the data signal transmission channel 6 to the second data line 3 of the three data lines 3 corresponding to the repeating unit D, so as to charge the fifth sub-pixel 15 in the repeating unit D.

As shown in FIGS. 6 and 9, in T1(*t*3), the level of the second data control signal SEN-2 is a high level, so that the fourth transistor M4 in the first second control sub-circuit 9 is turned on. The fourth transistor M4 transmits the data signal Source1 from the first data signal transmission channel 6 to the second data line 3 of the three data lines 3 corresponding to the first repeating unit D1, so as to charge the fifth sub-pixel 15 in the first repeating unit D1. Moreover, the voltage of the data signal Source1 in T1(*t*3) is a positive voltage, so that the fifth sub-pixel 15 in the first repeating unit D1 is charged with the positive voltage. Simultaneously, the fourth transistor M4 in the second second control sub-circuit 9 is turned on, and transmits the data signal Source2 from the second data signal transmission channel 6 to the second data line 3 of the three data lines 3 corresponding to the second repeating unit D2, so as to charge the fifth sub-pixel 15 in the second repeating unit D2. Moreover, the voltage of the data signal Source2 in T1(*t*3) is a negative voltage, so that the fifth sub-pixel 15 in the second repeating unit D2 is charged with the negative voltage.

In T1(*t*4), the second transistor M2 in the first first control sub-circuit 8 is turned on under control of the second scan control signal GEN-2 transmitted by the second scan control signal line 52, and transmits the scanning signal from the first scan signal transmission channel 4 to the gate line 2 coupled thereto (i.e., the second gate line 2), so as to turn on the second row of sub-pixels 1.

The third transistor M3 in each second control sub-circuit 9 is turned on under control of the first data control signal SEN-1 transmitted by the first data control signal line 71, and transmits the data signal from the data signal transmission channel 6 to the first data lines 3 of the three data lines 3 corresponding to the repeating unit D, so as to charge the fourth sub-pixel 14 in the repeating unit D.

As shown in FIGS. 6 and 9, in T1(*t*4), the level of the first data control signal SEN-1 is a high level, so that the third transistor M3 in the first second control sub-circuit 9 is turned on. The third transistor M3 transmits the data signal Source1 from the first data signal transmission channel 6 to the first data line 3 of the three data lines 3 corresponding to the first repeating unit D1, so as to charge the fourth sub-pixel 14 in the first repeating unit D1. Moreover, the voltage of the data signal Source1 in T1(*t*4) is a negative voltage, so that the fourth sub-pixel 14 in the first repeating unit D1 is charged with the negative voltage. Simultaneously, the third transistor M3 in the second second control sub-circuit 9 is turned on, and transmits the data signal Source2 from the second data signal transmission channel 6 to the first data line 3 of the three data lines 3 corresponding to the second repeating unit D2, so as to charge the fourth sub-pixel 14 in the second repeating unit D2. Moreover, the voltage of the data signal Source2 in T1(*t*4) is a positive voltage, so that the fourth sub-pixel 14 in the second repeating unit D2 is charged with the positive voltage.

In T1(*t*5), the second transistor M2 in the first first control sub-circuit 8 is turned on under control of the second scan control signal GEN-2 transmitted by the second scan control signal line 52, and transmits the scanning signal from the first scan signal transmission channel 4 to the gate line 2 coupled thereto (i.e., the second gate line 2), so as to turn on the second row of sub-pixels 1.

The switching unit 91 in each second control sub-circuit 9 is turned on under control of the first data control signal SEN-1 transmitted by the first data control signal line 71 and the second data control signal SEN-2 transmitted by the second data control signal line 72, and transmits the data signal from the data signal transmission channel 6 to the third data line 3 of the three data lines 3 corresponding to the repeating unit D, so as to charge the sixth sub-pixel 16 in the repeating unit D.

As shown in FIGS. 6 and 9, in T1(*t*5), the levels of the first data control signal SEN-1 and the second data control signal SEN-2 are both low levels, so that the sixth transistor M6 and the seventh transistor M7 in the switching unit 91 are both turned on in the first second control sub-circuit 9. The sixth transistor M6 and the seventh transistor M7 transmit the data signal Source1 from the first data signal transmission channel 6 to the third data line 3 of the three data lines 3 corresponding to the first repeating unit D1, so as to charge the sixth sub-pixel 16 in the first repeating unit D1. Moreover, the voltage of the data signal Source1 in T1(*t*5) is a negative voltage, so that the sixth sub-pixel 16 in the first repeating unit D1 is charged with the negative voltage. Simultaneously, the sixth transistor M6 and the seventh transistor M7 in the switching unit 91 are both turned on in the second second control sub-circuit 9, and transmit the data signal Source2 from the second data signal transmission channel 6 to the third data line 3 of the three data lines 3 corresponding to the second repeating unit D2, so as to charge the sixth sub-pixel 16 in the second repeating unit D2. Moreover, the voltage of the data signal Source2 in T1(*t*5) is a positive voltage, so that the sixth sub-pixel 16 in the second repeating unit D2 is charged with the positive voltage.

In T1(*t*6), the first transistor M1 in the first first control sub-circuit 8 is turned on under control of the first scan control signal GEN-1 transmitted by the first scan control signal line 51, and transmits the scanning signal from the first scan signal transmission channel 4 to the gate line 2 coupled thereto (i.e., the first gate line 2), so as to turn on the first row of sub-pixels 1.

The fourth transistor M4 in each second control sub-circuit 9 is turned on under control of the second data control signal SEN-2 transmitted by the second data control signal line 72, and transmits the data signal from the data signal transmission channel 6 to the second data line 3 of the three data lines 3 corresponding to the repeating unit D, so as to charge the second sub-pixel 12 in the repeating unit D.

As shown in FIGS. 6 and 9, in T1(*t*6), the level of the second data control signal SEN-2 is a high level, so that the fourth transistor M4 in the first second control sub-circuit 9 is turned on. The fourth transistor M4 transmits the data signal Source1 from the first data signal transmission channel 6 to the second data line 3 of the three data lines 3 corresponding to the first repeating unit D1, so as to charge the second sub-pixel 12 in the first repeating unit D1. Moreover, the voltage of the data signal Source1 in T1($t6$) is a negative voltage, so that the second sub-pixel 12 in the first repeating unit D1 is charged with the negative voltage. Simultaneously, the fourth transistor M4 in the second second control sub-circuit 9 is turned on, and transmits the data signal Source2 from the second data signal transmission channel 6 to the second data line 3 of the three data lines 3 corresponding to the second repeating unit D2, so as to charge the second sub-pixel 12 in the second repeating unit D2. Moreover, the voltage of the data signal Source2 in T1($t6$) is a positive voltage, so that the second sub-pixel 12 in the second repeating unit D2 is charged with the positive voltage.

In the second charging phase T2, the second scan signal transmission channel 4 transmits the scanning signal Gate2, and charges two corresponding rows of sub-pixels 1 (i.e., a third row of sub-pixels 1 and a fourth row of sub-pixels 1). For the driving process of six charging sub-phases in the second charging phase T2, reference may be, combined with the timing diagram shown in FIG. 9, made to the above description of the six charging sub-phases in the first charging phase T1, which will not be repeated herein.

As shown in FIG. 7, in some other examples, the switching unit 91 includes an NAND circuit 911 and an eighth transistor M8.

The NAND circuit 911 is coupled to the first data control signal line 71, the second data control signal line 72 and a control electrode of the eighth transistor M8. The NAND circuit 911 is configured to output a control signal for controlling the eighth transistor M8 to be turned on to the control electrode of the eighth transistor M8 under control of the first data control signal SEN-1 transmitted by the first data control signal line 71 and the second data control signal SEN-2 transmitted by the second data control signal line 72.

A first electrode of the eighth transistor M8 is coupled to the data signal transmission channel 6 coupled to the switching unit 91, and a second electrode of the eighth transistor M8 is coupled to the data line 3 coupled to the switching unit 91. The eighth transistor M8 is configured to be turned on under control of the control signal output by the NAND circuit 911, and transmit the data signal transmitted by the data signal transmission channel 6 that is coupled to the switching unit 91 to the data line 3 coupled to the switching unit 91.

According to characteristics of the NAND circuit 911, if two signals input to the NAND circuit 911 are both high levels (1), the NAND circuit 911 outputs a low level (0), and if at least one of the two signals input to the NAND circuit 911 is the low level (0), the NAND circuit 911 outputs the high level (1). Therefore, for example, in a case where at least one of the first data control signal SEN-1 transmitted by the first data control signal line 71 and the second data control signal SEN-2 transmitted by the second data control signal line 72 is the low level signal, the NAND circuit 911 is capable of outputting a high level signal. In a case where the eighth transistor M8 is the N-type transistor, the eighth transistor M8 is turned on under control of the high level signal, and transmits the data signal to the data line 3 coupled thereto.

In some embodiments, the third transistor M3, the fourth transistor M4 and the eighth transistor M8 are of a same type. For example, as shown in FIG. 7, the third transistor M3, the fourth transistor M4, and the eighth transistor M8 are all N-type transistors.

For the array substrate 20 shown in FIG. 7, in combination with the timing diagram shown in FIG. 9, the method includes the following steps.

One frame period includes n charging phases T, and each charging phase T includes six charging sub-phases t. In the following, the first charging phase T1 and the second charging phase T2 are taken as an example for description, in which the first transistor M1 and the second transistor M2 included in the first control sub-circuit 8 are both N-type transistors, and the third transistor M3, the fourth transistor M4 and the eighth transistor M8 included in the second control sub-circuit 9 are all N-type transistors.

In the first charging phase T1, the first scan signal transmission channel 4 transmits the scanning signal Gate1 and charges two corresponding rows of sub-pixels 1 (i.e., the first row of sub-pixels 1 and the second row of sub-pixels 1). The repeating units D divided by the two rows of sub-pixels 1 are the first repeating unit D1 to the m-th repeating unit D from left to right. Hereinafter, the p-th charging sub-phase tp of the k-th charging phase Tk is represented by Tk(tp), and k and p are both positive integers.

In T1($t1$), the first transistor M1 in the first first control sub-circuit 8 is turned on under control of the first scan control signal GEN-1 transmitted by the first scan control signal line 51, and transmits the scanning signal from the first scan signal transmission channel 4 to the gate line 2 coupled thereto (i.e., the first gate line 2), so as to turn on the first row of sub-pixels 1.

The third transistor M3 in each second control sub-circuit 9 is turned on under control of the first data control signal SEN-1 transmitted by the first data control signal line 71, and transmits the data signal from the data signal transmission channel 6 to the first data line 3 of the three data lines 3 corresponding to the repeating unit D, so as to charge the first sub-pixel 11 in the repeating unit D.

As shown in FIGS. 7 and 9, in T1($t1$), the level of the first data control signal SEN-1 is a high level, so that the third transistor M3 in the first second control sub-circuit 9 is turned on. The third transistor M3 transmits the data signal Source1 from the first data signal transmission channel 6 to the first data line 3 of the three data lines 3 corresponding to the first repeating unit D1, so as to charge the first sub-pixel 11 in the first repeating unit D1. Moreover, the voltage of the data signal Source1 in T1($t1$) is a positive voltage, so that the first sub-pixel 11 in the first repeating unit D1 is charged with the positive voltage. Simultaneously, the third transistor M3 in the second second control sub-circuit 9 is turned on, and transmits the data signal Source2 from the second data signal transmission channel 6 to the first data line 3 of the three data lines 3 corresponding to the second repeating unit D2, so as to charge the first sub-pixel 11 in the second repeating unit D2. Moreover, the voltage of the data signal Source2 in T1($t1$) is a negative voltage, so that the first sub-pixel 11 in the second repeating unit D2 is charged with the negative voltage.

In T1($t2$), the first transistor M1 in the first first control sub-circuit 8 is turned on under control of the first scan control signal GEN-1 transmitted by the first scan control signal line 51, and transmits the scanning signal from the first scan signal transmission channel 4 to the gate line 2 coupled thereto (i.e., the first gate line 2), so as to turn on the first row of sub-pixels 1.

The switching unit 91 in each second control sub-circuit 9 is turned on under control of the first data control signal SEN-1 transmitted by the first data control signal line 71 and the second data control signal SEN-2 transmitted by the second data control signal line 72, and transmits the data signal from the data signal transmission channel 6 to the third data line 3 of the three data lines 3 corresponding to the repeating unit D, so as to charge the third sub-pixel 13 in the repeating unit D.

As shown in FIGS. 7 and 9, in T1(t2), the levels of the first data control signal SEN-1 and the second data control signal SEN-2 are both low levels, so that in the first second control sub-circuit 9, the NAND circuit 911 in the switching unit 91 outputs the high level signal, and the eighth transistor M8 is turned on under control of the high level signal. The eighth transistor M8 transmits the data signal Source1 from the first data signal transmission channel 6 to the third data line 3 of the three data lines 3 corresponding to the first repeating unit D1, so as to charge the third sub-pixel 13 in the first repeating unit D1. Moreover, the voltage of the data signal Source1 in T1(t2) is a positive voltage, so that the third sub-pixel 13 in the first repeating unit D1 is charged with the positive voltage. Simultaneously, in the second second control sub-circuit 9, the NAND circuit 911 in the switching unit 91 outputs the high level signal, and the eighth transistor M8 is turned on under control of the high level signal. The eighth transistor M8 transmits the data signal Source2 from the second data signal transmission channel 6 to the third data line 3 of the three data lines 3 corresponding to the second repeating unit D2, so as to charge the third sub-pixel 13 in the second repeating unit D2. Moreover, the voltage of the data signal Source2 in T1(t2) is a negative voltage, so that the third sub-pixel 13 in the second repeating unit D2 is charged with the negative voltage.

In T1(t3), the second transistor M2 in the first first control sub-circuit 8 is turned on under control of the second scan control signal GEN-2 transmitted by the second scan control signal line 52, and transmits the scanning signal from the first scan signal transmission channel 4 to the gate line 2 coupled thereto (i.e., the second gate line 2), so as to turn on the second row of sub-pixels 1.

The fourth transistor M4 in each second control sub-circuit 9 is turned on under control of the second data control signal SEN-2 transmitted by the second data control signal line 72, and transmits the data signal from the data signal transmission channel 6 to the second data line 3 of the three data lines 3 corresponding to the repeating unit D, so as to charge the fifth sub-pixel 15 in the repeating unitD.

As shown in FIGS. 7 and 9, in T1(t3), the level of the second data control signal SEN-2 is a high level, so that the fourth transistor M4 in the first second control sub-circuit 9 is turned on. The fourth transistor M4 transmits the data signal Source1 from the first data signal transmission channel 6 to the second data line 3 of the three data lines 3 corresponding to the first repeating unit D1, so as to charge the fifth sub-pixel 15 in the first repeating unit D1. Moreover, the voltage of the data signal Source1 in T1(t3) is a positive voltage, so that the fifth sub-pixel 15 in the first repeating unit D1 is charged with the positive voltage. Simultaneously, the fourth transistor M4 in the second second control sub-circuit 9 is turned on, and transmits the data signal Source2 from the second data signal transmission channel 6 to the second data line 3 of the three data lines 3 corresponding to the second repeating unit D2, so as to charge the fifth sub-pixel 15 in the second repeating unit D2. Moreover, the voltage of the data signal Source2 in T1(t3) is a negative voltage, so that the fifth sub-pixel 15 in the second repeating unit D2 is charged with the negative voltage.

In T1(t4), the second transistor M2 in the first first control sub-circuit 8 is turned on under control of the second scan control signal GEN-2 transmitted by the second scan control signal line 52, and transmits the scanning signal from the first scan signal transmission channel 4 to the gate line 2 coupled thereto (i.e., the second gate line 2), so as to turn on the second row of sub-pixels 1.

The third transistor M3 in each second control sub-circuit 9 is turned on under control of the first data control signal SEN-1 transmitted by the first data control signal line 71, and transmits the data signal from the data signal transmission channel 6 to the first data lines 3 of the three data lines 3 corresponding to the repeating unit D, so as to charge the fourth sub-pixel 14 in the repeating unit D.

As shown in FIGS. 7 and 9, in T1(t4), the level of the first data control signal SEN-1 is a high level, so that the third transistor M3 in the first second control sub-circuit 9 is turned on. The third transistor M3 transmits the data signal Source1 from the first data signal transmission channel 6 to the first data line 3 of the three data lines 3 corresponding to the first repeating unit D1, so as to charge the fourth sub-pixel 14 in the first repeating unit D1. Moreover, the voltage of the data signal Source1 in T1(t4) is a negative voltage, so that the fourth sub-pixel 14 in the first repeating unit D1 is charged with the negative voltage. Simultaneously, the third transistor M3 in the second second control sub-circuit 9 is turned on, and transmits the data signal Source2 from the second data signal transmission channel 6 to the first data line 3 of the three data lines 3 corresponding to the second repeating unit D2, so as to charge the fourth sub-pixel 14 in the second repeating unit D2. Moreover, the voltage of the data signal Source2 in T1(t4) is a positive voltage, so that the fourth sub-pixel 14 in the second repeating unit D2 is charged with the positive voltage.

In T1(t5), the second transistor M2 in the first first control sub-circuit 8 is turned on under control of the second scan control signal GEN-2 transmitted by the second scan control signal line 52, and transmits the scanning signal from the first scan signal transmission channel 4 to the gate line 2 coupled thereto (i.e., the second gate line 2), so as to turn on the second row of sub-pixels 1.

The switching unit 91 in each second control sub-circuit 9 is turned on under control of the first data control signal SEN-1 transmitted by the first data control signal line 71 and the second data control signal SEN-2 transmitted by the second data control signal line 72, and transmits the data signal from the data signal transmission channel 6 to the third data line 3 of the three data lines 3 corresponding to the repeating unit D, so as to charge the sixth sub-pixel 16 in the repeating unit D.

As shown in FIGS. 7 and 9, in T1(t5), the levels of the first data control signal SEN-1 and the second data control signal SEN-2 are both low levels, so that in the first second control sub-circuit 9, the NAND circuit 911 in the switching unit 91 outputs the high level signal, and the eighth transistor M8 is turned on under control of the high level signal. The eighth transistor M8 transmits the data signal Source1 from the first data signal transmission channel 6 to the third data line 3 of the three data lines 3 corresponding to the first repeating unit D1, so as to charge the sixth sub-pixel 16 in the first repeating unit D1. Moreover, the voltage of the data signal Source1 in T1(t5) is a negative voltage, so that the sixth sub-pixel 16 in the first repeating unit D1 is charged with the negative voltage. Simultaneously, in the second second control sub-circuit 9, the NAND circuit 911 in the switching unit 91 outputs the high level signal, and the eighth transistor M8 is turned on under control of the high level signal. The eighth transistor M8 transmits the data signal Source2 from the second data signal transmission channel 6 to the third data line 3 of the three data lines 3 corresponding to the second repeating unit D2, so as to charge the sixth sub-pixel 16 in the second repeating unit D2. Moreover, the voltage of the data signal Source2 in T1($t5$) is a positive voltage, so that the sixth sub-pixel 16 in the second repeating unit D2 is charged with the positive voltage.

In T1($t6$), the first transistor M1 in the first first control sub-circuit 8 is turned on under control of the first scan control signal GEN-1 transmitted by the first scan control signal line 51, and transmits the scanning signal from the first scan signal transmission channel 4 to the gate line 2 coupled thereto (i.e., the first gate line 2), so as to turn on the first row of sub-pixels 1.

The fourth transistor M4 in each second control sub-circuit 9 is turned on under control of the second data control signal SEN-2 transmitted by the second data control signal line 72, and transmits the data signal from the data signal transmission channel 6 to the second data line 3 of the three data lines 3 corresponding to the repeating unit D, so as to charge the second sub-pixel 12 in the repeating unit D.

As shown in FIGS. 7 and 9, in T1($t6$), the level of the second data control signal SEN-2 is a high level, so that the fourth transistor M4 in the first second control sub-circuit 9 is turned on. The fourth transistor M4 transmits the data signal Source1 from the first data signal transmission channel 6 to the second data line 3 of the three data lines 3 corresponding to the first repeating unit D1, so as to charge the second sub-pixel 12 in the first repeating unit D1. Moreover, the voltage of the data signal Source1 in T1($t6$) is a negative voltage, so that the second sub-pixel 12 in the first repeating unit D1 is charged with the negative voltage. Simultaneously, the fourth transistor M4 in the second second control sub-circuit 9 is turned on, and transmits the data signal Source2 from the second data signal transmission channel 6 to the second data line 3 of the three data lines 3 corresponding to the second repeating unit D2, so as to charge the second sub-pixel 12 in the second repeating unit D2. Moreover, the voltage of the data signal Source2 in T1($t6$) is a positive voltage, so that the second sub-pixel 12 in the second repeating unit D2 is charged with the positive voltage.

In the second charging phase T2, the second scan signal transmission channel 4 transmits the scanning signal Gate2, and charges two corresponding rows of sub-pixels 1 (i.e., a third row of sub-pixels 1 and a fourth row of sub-pixels 1). For the driving process of six charging sub-phases in the second charging phase T2, reference may be, combined with the timing diagram shown in FIG. 9, made to the above description of the six charging sub-phases in the first charging phase T1, which will not be repeated herein.

In the array substrate 20 provided by some embodiments of the present disclosure, the control electrode of the adopted transistor is the gate of the transistor, the first electrode thereof may be the source, and the second electrode thereof may be the drain; or, the first electrode thereof may be the drain, and the second electrode thereof may be the source, which is not limited in the present disclosure. Since the source and the drain of the transistor may be symmetrical in structure, there may be no difference in structure between the source and the drain of the transistor. That is, there may be no difference in structure between the first electrode and the second electrode of the transistor in the embodiments of the present disclosure. For example, in a case where the transistor is the P-type transistor, the first electrode of the transistor is the source, and the second electrode thereof is the drain. For example, in a case where the transistor is the N-type transistor, the first electrode of the transistor is the drain, and the second electrode thereof is the source.

In some embodiments, as shown in FIG. 4, in the array substrate 20 provided by some embodiments of the present disclosure, the at least one scan control signal line 5 extends in a column direction in which the plurality of sub-pixels 1 are arranged, and the at least one data control signal line 7 extends in a row direction in which the plurality of sub-pixels 1 are arranged.

In some examples, as shown in FIG. 4, the array substrate 20 includes a display area AA and a peripheral region BB. The plurality of sub-pixels 1, the plurality of gate lines 2 and the plurality of data lines 3 in the array substrate 20 are disposed in the display area AA. The plurality of scan signal transmission channels 4, the at least one scanning control signal line 5, the plurality of data signal transmission channels 6 and at least one data control signal line 7, the plurality of first control sub-circuits 8 and the plurality of second control sub-circuits 9 are disposed in the peripheral region BB.

In some embodiments, each sub-pixel 1 includes a driving transistor. As shown in FIGS. 5 to 7, in a case where the first control sub-circuit 8 in the array substrate 20 includes the first transistor M1 and the second transistor M2, and the second control sub-circuit 9 includes the third transistor M3 and the fourth transistor M4, gates, active layers, and sources and drains of the first transistor M1, the second transistor M2, the third transistor M3, and the fourth transistor M4 are respectively arranged in a same layer as the gate, the active layer, the source and the drain of the driving transistor.

In the embodiments, layers of the first transistor M1, the second transistor M2, the third transistor M3, and the fourth transistor M4 are respectively arranged in a same layer corresponding to layers of the driving transistor in the sub-pixel 1. During the fabrication of the array substrate 20, the same layer may be formed simultaneously through one patterning process, thereby simplifying a fabrication process and improving the fabrication efficiency.

In some embodiments, in the array substrate 20 provided by the present disclosure, the driving transistor included in each sub-pixel 1 is an oxide thin film transistor (Oxide TFT). The carrier mobility of the oxide thin film transistor is high, a signal transmission rate is fast, and cost is low, so that the array substrate 20 of the present disclosure may be practical.

As shown in FIG. 11, the display apparatus 30 provided by some embodiments of the present disclosure includes the array substrate 20, the gate driving circuit 301, and the source driving circuit 302. The display apparatus 30 has an advantage of saving the number of scan signal output channels 3011 in the gate driving circuit 301 and the number of data signal output channels 3021 in the source driving circuit 302. Therefore, the cost is reduced. And during the display process, there are few flicker and crosstalk, so that the power consumption is reduced.

The display apparatus 30 may be a television, a mobile phone, a computer, a notebook computer, a tablet computer, a personal digital assistant (PDA), or a vehicle-mounted computer, etc., which is not limited in the present disclosure.

The foregoing descriptions are merely specific implementations of the present disclosure, but the protection scope of the present disclosure is not limited thereto. Any person skilled in the art could conceive of changes or replacements within the technical scope of the present disclosure, which shall be included in the protection scope of the present disclosure. Therefore, the protection scope of the present disclosure shall be subject to the protection scope of the claims.

What is claimed is:

1. A method for driving an array substrate, the array substrate including:
   a plurality of sub-pixels, a plurality of gate lines, and a plurality of data lines; the plurality of sub-pixels being arranged in an array, a row of sub-pixels being coupled to one gate line, and a column of sub-pixels being coupled to one data line;
   a plurality of scan signal transmission channels, at least one scan control signal line, a plurality of data signal transmission channels, and at least one data control signal line;
   a plurality of first control sub-circuits, each first control sub-circuit being coupled to the at least one scan control signal line, one scan signal transmission channel, and two gate lines;
   a plurality of second control sub-circuits, and each second control sub-circuit being coupled to the at least one data control signal line, one data signal transmission channel and three data lines; and
   two rows of sub-pixels controlled by the two gate lines that are coupled to each first control sub-circuit being divided into a plurality of repeating units arranged in a row direction, and each repeating unit including six sub-pixels arranged in two rows and three columns, wherein the six sub-pixels included in the repeating unit are a first sub-pixel, a second sub-pixel, a third sub-pixel, a fourth sub-pixel, a fifth sub-pixel, and a sixth sub-pixel;
   the method comprising:
   charging the six sub-pixels of each repeating unit controlled by the two gate lines that are coupled to one first control sub-circuit in each of a plurality of charging phases in a frame period; each charging phase including six charging sub-phases, and one sub-pixel of each repeating unit being charged in each charging sub-phase, wherein the six charging sub-phases included in the charging phases are a first charging sub-phase, a second charging sub-phase, a third charging sub-phase, a fourth charging sub-phase, a fifth charging sub-phase, and a sixth charging sub-phase; wherein
   one sub-pixel of each repeating unit being charged in each charging sub-phase, includes:
   in each charging sub-phase,
   transmitting, by the first control sub-circuit, a scanning signal from the scan signal transmission channel to one of the two gate lines coupled thereto under control of a scan control signal transmitted by the at least one scan control signal line, so as to turn on a row of sub-pixels controlled by the gate line; and
   transmitting, by the second control sub-circuit, a data signal from the data signal transmission channel to one data line coupled to the repeating unit under control of a data control signal transmitted by the at least one data control signal line, so as to charge one sub-pixel in the repeating unit; wherein
   a voltage of the data signal transmitted by each data signal transmission channel switches between a positive voltage and a negative voltage, and a duration of the positive voltage and a duration of the negative voltage are each three charging sub-phases, and voltages of data signals transmitted by any two adjacent data signal transmission channels have opposite polarities in a same charging sub-phase; and
   transmitting, by the first control sub-circuit, a scanning signal from the scan signal transmission channel to one of the two gate lines coupled thereto under control of a scan control signal transmitted by the at least one scan control signal line, so as to turn on a row of sub-pixels controlled by the gate line; and transmitting, by the second control sub-circuit, a data signal from the data signal transmission channel to one data line coupled to the repeating unit under control of a data control signal transmitted by the at least one data control signal line, so as to charge one sub-pixel in the repeating unit, includes:
   in the first charging sub-phase,
   transmitting, by the first control sub-circuit, the scanning signal from the scan signal transmission channel to a first gate line of the two gate lines coupled thereto under the control of the scan control signal transmitted by the at least one scan control signal line, so as to turn on the row of sub-pixels controlled by the first gate line;
   transmitting, by the second control sub-circuit, the data signal from the data signal transmission channel to a first data line of the three data lines coupled to the repeating unit under the control of the data control signal transmitted by the at least one data control signal line, so as to charge a first sub-pixel in the repeating unit;
   in the second charging sub-phase,
   continuously transmitting, by the first control sub-circuit, the scanning signal from the scan signal transmission channel to the first gate line of the two gate lines coupled thereto under the control of the scan control signal transmitted by the at least one scan control signal line, so as to continuously turn on the row of sub-pixels controlled by the first gate line;
   transmitting, by the second control sub-circuit, the data signal from the data signal transmission channel to a third data line of the three data lines coupled to the repeating unit under the control of the data control signal transmitted by the at least one data control signal line, so as to charge a third sub-pixel in the repeating unit;
   in the third charging sub-phase,
   transmitting, by the first control sub-circuit, the scanning signal from the scan signal transmission channel to a second gate line of the two gate lines coupled thereto under the control of the scan control signal transmitted by the at least one scan control signal line, so as to turn on the row of sub-pixels controlled by the second gate line;
   transmitting, by the second control sub-circuit, the data signal from the data signal transmission channel to a second data line of the three data lines coupled to the repeating unit under the control of the data control signal transmitted by the at least one data control signal line, so as to charge a fifth sub-pixel in the repeating unit;
   in the fourth charging sub-phase,
   continuously transmitting, by the first control sub-circuit, the scanning signal from the scan signal transmission channel to the second gate line of the two gate lines coupled thereto under the control of the scan control signal transmitted by the at least one scan control signal line, so as to continuously turn on the row of sub-pixels controlled by the second gate line;
   transmitting, by the second control sub-circuit, the data signal from the data signal transmission channel to the first data line of the three data lines coupled to the repeating unit under the control of the data control signal transmitted by the at least one data control signal line, so as to charge a fourth sub-pixel in the repeating unit;

in the fifth charging sub-phase, continuously transmitting, by the first control sub-circuit, the scanning signal from the scan signal transmission channel to the second gate line of the two gate lines coupled thereto under the control of the scan control signal transmitted by the at least one scan control signal line, so as to continuously turn on the row of sub-pixels controlled by the second gate line;

transmitting, by the second control sub-circuit, the data signal from the data signal transmission channel to the third data line of the three data lines coupled to the repeating unit under the control of the data control signal transmitted by the at least one data control signal line, so as to charge a sixth sub-pixel in the repeating unit;

in the sixth charging sub-phase, transmitting, by the first control sub-circuit, the scanning signal from the scan signal transmission channel to the first gate line of the two gate lines coupled thereto under the control of the scan control signal transmitted by the at least one scan control signal line, so as to turn on the row of sub-pixels controlled by the first gate line;

transmitting, by the second control sub-circuit, the data signal from the data signal transmission channel to the second data line of the three data lines coupled to the repeating unit under the control of the data control signal transmitted by the at least one data control signal line, so as to charge a second sub-pixel in the repeating unit; wherein in an odd-numbered repeating unit, the first sub-pixel, the third sub-pixel, and the fifth sub-pixel are charged with a first voltage, and the second sub-pixel, the fourth sub-pixel, and the sixth sub-pixel are charged with a second voltage; in an even-numbered repeating unit, the first sub-pixel, the third sub-pixel, and the fifth sub-pixel are charged with the second voltage, and the second sub-pixel, the fourth sub-pixel, and the sixth sub-pixel are charged with the first voltage;

the first voltage and the second voltage have opposite polarities.

2. The method according to claim 1, wherein the at least one scan control signal line includes a first scan control signal line and a second scan control signal line;

the first control sub-circuit includes a first transistor and a second transistor;

in the first charging sub-phase, the second charging sub-phase and the sixth charging sub-phase, transmitting, by the first control sub-circuit, the scanning signal from the scan signal transmission channel to the first gate line of the two gate lines coupled thereto under the control of the scan control signal transmitted by the at least one scan control signal line, including:

when the first transistor in the first control sub-circuit is turned on under control of a first scan control signal transmitted by the first scan control signal line in the first charging sub-phase, the second charging sub-phase and the sixth charging sub-phase, transmitting, by the first transistor, the scanning signal from the scan signal transmission channel to the first gate line coupled thereto; and in the third charging sub-phase, the fourth charging sub-phase and the fifth charging sub-phase, transmitting, by the first control sub-circuit, the scanning signal from the scan signal transmission channel to the second gate line of the two gate lines coupled thereto under the control of the scan control signal transmitted by the at least one scan control signal line, including:

when the second transistor in the first control sub-circuit is turned on under control of a second scan control signal transmitted by the second scan control signal line in the third charging sub-phase, the fourth charging sub-phase and the fifth charging sub-phase, transmitting, by the second transistor, the scanning signal from the scan signal transmission channel to the second gate line coupled thereto.

3. The method according to claim 2, wherein the at least one data control signal line includes a first data control signal line, a second data control signal line, and a third data control signal line;

the second control sub-circuit includes a third transistor, a fourth transistor, and a fifth transistor;

in the first charging sub-phase and the fourth charging sub-phase, transmitting, by the second control sub-circuit, the data signal from the data signal transmission channel to the first data line of the three data lines coupled to the repeating unit, under the control of the data control signal transmitted by the at least one data control signal line, includes:

when the third transistor in the second control sub-circuit is turned on under control of a first data control signal transmitted by the first data control signal line in the first charging sub-phase, transmitting, by the third transistor, the data signal from the data signal transmission channel to the first data line of the three data lines corresponding to the repeating unit, so as to charge the first sub-pixel in the repeating unit;

when the third transistor in the second control sub-circuit is turned on under the control of the first data control signal transmitted by the first data control signal line in the fourth charging sub-phase, the third transistor transmits the data signal from the data signal transmission channel to the first data line of the three data lines corresponding to the repeating unit, so as to charge the fourth sub-pixel in the repeating unit;

in the second charging sub-phase and the fifth charging sub-phase, transmitting, by the second control sub-circuit, the data signal from the data signal transmission channel to the third data line of the three data lines coupled to the repeating unit, under the control of the data control signal transmitted by the at least one data control signal line, includes:

when the fifth transistor in the second control sub-circuit is turned on under control of a third data control signal transmitted by the third data control signal line in the second charging sub-phase, transmitting, by the fifth transistor, the data signal from the data signal transmission channel to the third data line of the three data lines corresponding to the repeating unit, so as to charge the third sub-pixel in the repeating unit;

when the fifth transistor in the second control sub-circuit is turned on under the control of the third data control signal transmitted by the third data control signal line in the fifth charging sub-phase, the fifth transistor transmits the data signal from the data signal transmission channel to the third data line of the three data lines corresponding to the repeating unit, so as to charge the sixth sub-pixel in the repeating unit; and in the third charging sub-phase and the sixth charging sub-phase, transmitting, by the second control sub-circuit, the data signal from the data signal transmission channel to the second data line of the three data lines coupled to the repeating unit, under the control of the data control signal transmitted by the at least one data control signal line, includes:
when the fourth transistor in the second control sub-circuit is turned on under control of a second data control signal transmitted by the second data control signal line in the third charging sub-phase, transmitting, by the fourth transistor, the data signal from the data signal transmission channel to the second data line of the three data lines corresponding to the repeating unit, so as to charge the fifth sub-pixel in the repeating unit;
when the fourth transistor in the second control sub-circuit is turned on under the control of the second data control signal transmitted by the second data control signal line in the sixth charging sub-phase, transmitting, by the fourth transistor, the data signal from the data signal transmission channel to the second data line of the three data lines corresponding to the repeating unit, so as to charge the second sub-pixel in the repeating unit.

4. The method according to claim 2, wherein the at least one data control signal line includes a first data control signal line and a second data control signal line, and the second control sub-circuit includes a third transistor, a fourth transistor and a switching unit;
in the first charging sub-phase and the fourth charging sub-phase, transmitting, by the second control sub-circuit, the data signal from the data signal transmission channel to the first data line of the three data lines coupled to the repeating unit, under the control of the data control signal transmitted by the at least one data control signal line, includes:
when the third transistor in the second control sub-circuit is turned on under control of a first data control signal transmitted by the first data control signal line in the first charging sub-phase, transmitting, by the third transistor, the data signal from the data signal transmission channel to the first data line of the three data lines corresponding to the repeating unit, so as to charge the first sub-pixel in the repeating unit;
when the third transistor in the second control sub-circuit is turned on under the control of the first data control signal transmitted by the first data control signal line in the fourth charging sub-phase, transmitting, by the third transistor, the data signal from the data signal transmission channel to the first data line of the three data lines corresponding to the repeating unit, so as to charge the fourth sub-pixel in the repeating unit;
in the second charging sub-phase and the fifth charging sub-phase, transmitting, by the second control sub-circuit, the data signal from the data signal transmission channel to the third data line of the three data lines coupled to the repeating unit, under the control of the data control signal transmitted by the at least one data control signal line, includes:
when the switching unit in the second control sub-circuit is turned on under control of the first data control signal transmitted by the first data control signal line and a second data control signal transmitted by the second data control signal line in the second charging sub-phase, transmitting, by the switching unit, the data signal from the data signal transmission channel to the third data line of the three data lines corresponding to the repeating unit, so as to charge the third sub-pixel in the repeating unit;
when the switching unit in the second control sub-circuit is turned on under the control of the first data control signal transmitted by the first data control signal line and the second data control signal transmitted by the second data control signal line in the fifth charging sub-phase, transmitting, by the switching unit, the data signal from the data signal transmission channel to the third data line of the three data lines corresponding to the repeating unit, so as to charge the sixth sub-pixel in the repeating unit; and
in the third charging sub-phase and the sixth charging sub-phase, transmitting, by the second control sub-circuit, the data signal from the data signal transmission channel to the second data line of the three data lines coupled to the repeating unit, under the control of the data control signal transmitted by the at least one data control signal line, includes:
when the fourth transistor in the second control sub-circuit is turned on under control of the second data control signal transmitted by the second data control signal line in the third charging sub-phase, transmitting, by the fourth transistor, the data signal from the data signal transmission channel to the second data line of the three data lines corresponding to the repeating unit, so as to charge the fifth sub-pixel in the repeating unit;
when the fourth transistor in the second control sub-circuit is turned on under the control of the second data control signal transmitted by the second data control signal line in the sixth charging sub-phase, transmitting, by the fourth transistor, the data signal from the data signal transmission channel to the second data line of the three data lines corresponding to the repeating unit, so as to charge the second sub-pixel in the repeating unit.

5. An array substrate, comprising:
a plurality of sub-pixels, a plurality of gate lines, and a plurality of data lines; the plurality of sub-pixels being arranged in an array, a row of sub-pixels being coupled to one gate line, and a column of sub-pixels being coupled to one data line;
a plurality of scan signal transmission channels, at least one scan control signal line, a plurality of data signal transmission channels, and at least one data control signal line;
a plurality of first control sub-circuits, each first control sub-circuit being coupled to the at least one scan control signal line, one scan signal transmission channel and two gate lines; the first control sub-circuit being configured to transmit a scanning signal transmitted by the scan signal transmission channel coupled thereto to the two gate lines coupled thereto under control of a scan control signal transmitted by the at least one scan control signal line, so as to turn on two rows of sub-pixels coupled to the two gate lines at different times; and
a plurality of second control sub-circuits, each second control sub-circuit being coupled to the at least one data control signal line, one data signal transmission channel and three data lines; the second control sub-circuit being configured to transmit a data signal transmitted by the data signal transmission channel coupled thereto to the three data lines coupled thereto under control of a data control signal transmitted by the at least one data control signal line, so as to charge sub-pixels that are turned on by the two gate lines coupled to the first control sub-circuit in sub-pixels coupled to the three data lines at different times, wherein the at least one scan control signal line includes a first scan control signal line and a second scan control signal line;

the first control sub-circuit includes a first transistor and a second transistor; wherein a control electrode of the first transistor is coupled to the first scan control signal line, a first electrode of the first transistor is coupled to the scan signal transmission channel coupled to the first control sub-circuit, and a second electrode of the first transistor is coupled to one of the two gate lines coupled to the first control sub-circuit; and a control electrode of the second transistor is coupled to the second scan control signal line, a first electrode of the second transistor is coupled to the scan signal transmission channel coupled to the first control sub-circuit, and a second electrode of the second transistor is coupled to another of the two gate lines coupled to the first control sub-circuit.

6. The array substrate according to claim 5, wherein the plurality of sub-pixels are arranged in 2n rows and 3m columns;

the plurality of gate lines include 2n gate lines, the plurality of data lines include 3m data lines, the plurality of scan signal transmission channels include n scan signal transmission channels, the plurality of data signal transmission channels include m data signal transmission channels, the at least one scan control signal line includes two scan control signal lines, the at least one data control signal line includes at least two data control signal lines, the plurality of first control sub-circuits include n first control sub-circuits, and the plurality of second control sub-circuits include m second control sub-circuits; wherein n and m are positive integers;

an i-th first control sub-circuit is coupled to an i-th scan signal transmission channel, a (2i−1)-th gate line and a 2i-th gate line; wherein i is greater than or equal to 1 and less than or equal to n (1≤i≤n), and i is a positive integer; and a j-th second control sub-circuit is coupled to a j-th data signal transmission channel, a (3j−2)-th data line, a (3j−1)-th data line, and a 3j-th data line; wherein j is greater than or equal to 1 and less than or equal to m (1≤j≤m), and j is a positive integer.

7. The array substrate according to claim 5, wherein the at least one data control signal line includes a first data control signal line and a second data control signal line;

the second control sub-circuits includes a third transistor and a fourth transistor; wherein a control electrode of the third transistor is coupled to the first data control signal line, a first electrode of the third transistor is coupled to the data signal transmission channel that is coupled to the second control sub-circuit, and a second electrode of the third transistor is coupled to a first data line of the three data lines coupled to the second control sub-circuit; and a control electrode of the fourth transistor is coupled to the second data control signal line, a first electrode of the fourth transistor is coupled to the data signal transmission channel that is coupled to the second control sub-circuit, and a second electrode of the fourth transistor is coupled to a second data line of the three data lines coupled to the second control sub-circuit.

8. The array substrate according to claim 7, wherein the at least one data control signal line further includes a third data control signal line; and the second control sub-circuit further includes a fifth transistor; wherein a control electrode of the fifth transistor is coupled to the third data control signal line, a first electrode of the fifth transistor is coupled to the data signal transmission channel that is coupled to the second control sub-circuit, and a second electrode of the fifth transistor is coupled to a third data line of the three data lines coupled to the second control sub-circuit.

9. The array substrate according to claim 7, wherein the second control sub-circuit further includes a switching unit;

the switching unit is coupled to the first data control signal line and the second data control signal line, and the switching unit is also coupled to the data signal transmission channel that is coupled to the second control sub-circuit and a third data line of the three data lines that are coupled to the second control sub-circuit; and the switching unit is configured to transmit the data signal transmitted by the data signal transmission channel coupled thereto to the third data line coupled thereto under control of a first data control signal transmitted by the first data control signal line and a second data control signal transmitted by the second data control signal line.

10. The array substrate according to claim 9, wherein the switching unit includes a sixth transistor and a seventh transistor, wherein a control electrode of the sixth transistor is coupled to the first data control signal line, a first electrode of the sixth transistor is coupled to the data signal transmission channel that is coupled to the switching unit, and a second electrode of the sixth transistor is coupled to a first electrode of the seventh transistor; and a control electrode of the seventh transistor is coupled to the second data control signal line, and a second electrode of the seventh transistor is coupled to the third data line coupled to the switching unit.

11. The array substrate according to claim 10, wherein the sixth transistor and the seventh transistor are of a same type, the third transistor and the fourth transistor are of a same type, and the type of the sixth transistor and the seventh transistor is different from the type of the third transistor and the fourth transistor.

12. The array substrate according to claim 9, wherein the switching unit includes an NAND circuit and an eighth transistor, wherein the NAND circuit is coupled to the first data control signal line, the second data control signal line and a control electrode of the eighth transistor;

the NAND circuit is configured to output a control signal for controlling the eighth transistor to be turned on under control of the first data control signal transmitted by the first data control signal line and the second data control signal transmitted by the second data control signal line; and a first electrode of the eighth transistor is coupled to the data signal transmission channel that is coupled to the switching unit, and a second electrode of the eighth transistor is coupled to the third data line that is coupled to the switching unit.

13. The array substrate according to claim 12, wherein the third transistor, the fourth transistor, and the eighth transistor are of a same type.

14. The array substrate according to claim 5, wherein the at least one scan control signal line extends in a column direction in which the plurality of sub-pixels are arranged, and the at least one data control signal line extends in a row direction in which the plurality of sub-pixels are arranged.

15. A display apparatus, comprising:
the array substrate according to claim 5;
a gate driving circuit having a plurality of scan signal output channels and at least one scan control signal output channel, each scan signal output channel being coupled to one scan signal transmission channel in the array substrate, and each scan control signal output channel being coupled to one scan control signal line in the array substrate; and
a source driving circuit having a plurality of data signal output channels and at least one data control signal output channel, each data signal output channel being coupled to one data signal transmission channel in the array substrate, and each data control signal output channel being coupled to one data control signal line in the array substrate.

16. The display apparatus according to claim 15, wherein the gate driving circuit has two scan control signal output channels, and the source driving circuit has two or three data control signal output channels.

17. An array substrate, comprising:
a plurality of sub-pixels, a plurality of gate lines, and a plurality of data lines; the plurality of sub-pixels being arranged in an array, a row of sub-pixels being coupled to one gate line, and a column of sub-pixels being coupled to one data line;
a plurality of scan signal transmission channels, at least one scan control signal line, a plurality of data signal transmission channels, and at least one data control signal line;
a plurality of first control sub-circuits, each first control sub-circuit being coupled to the at least one scan control signal line, one scan signal transmission channel and two gate lines; the first control sub-circuit being configured to transmit a scanning signal transmitted by the scan signal transmission channel coupled thereto to the two gate lines coupled thereto under control of a scan control signal transmitted by the at least one scan control signal line, so as to turn on two rows of sub-pixels coupled to the two gate lines at different times; and
a plurality of second control sub-circuits, each second control sub-circuit being coupled to the at least one data control signal line, one data signal transmission channel and three data lines; the second control sub-circuit being configured to transmit a data signal transmitted by the data signal transmission channel coupled thereto to the three data lines coupled thereto under control of a data control signal transmitted by the at least one data control signal line, so as to charge sub-pixels that are turned on by the two gate lines coupled to the first control sub-circuit in sub-pixels coupled to the three data lines at different times, wherein
each sub-pixel includes a driving transistor;
the at least one scan control signal line includes a first scan control signal line and a second scan control signal line, and the at least one data control signal line includes a first data control signal line and a second data control signal line;
the first control sub-circuit includes a first transistor and a second transistor, and the second control sub-circuit includes a third transistor and a fourth transistor;
a control electrode of the first transistor is coupled to the first scan control signal line, a first electrode of the first transistor is coupled to the scan signal transmission channel coupled to the first control sub-circuit, and a second electrode of the first transistor is coupled to one of the two gate lines coupled to the first control sub-circuit;
a control electrode of the second transistor is coupled to the second scan control signal line, a first electrode of the second transistor is coupled to the scan signal transmission channel coupled to the first control sub-circuit, and a second electrode of the second transistor is coupled to another of the two gate lines coupled to the first control sub-circuit;
a control electrode of the third transistor is coupled to the first data control signal line, a first electrode of the third transistor is coupled to the data signal transmission channel that is coupled to the second control sub-circuit, and a second electrode of the third transistor is coupled to a first data line of the three data lines coupled to the second control sub-circuit;
a control electrode of the fourth transistor is coupled to the second data control signal line, a first electrode of the fourth transistor is coupled to the data signal transmission channel that is coupled to the second control sub-circuit, and a second electrode of the fourth transistor is coupled to a second data line of the three data lines coupled to the second control sub-circuit; and
gates, active layers, and sources and drains of the first transistor, the second transistor, the third transistor, and the fourth transistor are respectively disposed in a same layer as a gate, an active layer, and a source and a drain of the driving transistor.

18. A display apparatus, comprising:
the array substrate according to claim 17;
a gate driving circuit having a plurality of scan signal output channels and at least one scan control signal output channel, each scan signal output channel being coupled to one scan signal transmission channel in the array substrate, and each scan control signal output channel being coupled to one scan control signal line in the array substrate; and
a source driving circuit having a plurality of data signal output channels and at least one data control signal output channel, each data signal output channel being coupled to one data signal transmission channel in the array substrate, and each data control signal output channel being coupled to one data control signal line in the array substrate.

19. The display apparatus according to claim 18, wherein the gate driving circuit has two scan control signal output channels, and the source driving circuit has two or three data control signal output channels.

* * * * *